US012798253B2

(12) United States Patent
Koizumi et al.

(10) Patent No.: US 12,798,253 B2
(45) Date of Patent: Nov. 17, 2026

(54) CARTRIDGE

(71) Applicant: SEIKO EPSON CORPORATION, Tokyo (JP)

(72) Inventors: Yoshihiro Koizumi, Shiojiri (JP); Takumi Nagashima, Matsumoto (JP); Shun Oya, Kiso-machi (JP); Tadahiro Mizutani, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 18/904,893

(22) Filed: Oct. 2, 2024

(65) Prior Publication Data

US 2025/0108621 A1 Apr. 3, 2025

(30) Foreign Application Priority Data

Oct. 3, 2023 (JP) ................................ 2023-171795

(51) Int. Cl.
*B41J 2/175* (2006.01)

(52) U.S. Cl.
CPC ....... *B41J 2/17523* (2013.01); *B41J 2/17513* (2013.01)

(58) Field of Classification Search
CPC ................ B41J 2/17523; B41J 2/17513; B41J 2/17509; B41J 2/1752; B41J 2/17553
USPC ...................................................... 347/20, 86
See application file for complete search history.

(56) References Cited

U.S. PATENT DOCUMENTS 11,850,865 B2 12/2023 Oya et al.
2005/0134663 A1* 6/2005 Sasaki ................. B41J 2/17596 347/86

FOREIGN PATENT DOCUMENTS

JP 2022-154024 A 10/2022

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A cartridge includes a liquid containing body includes a liquid containing portion that is formed inside the liquid containing body and that contains a liquid, and a liquid supply portion, the liquid supply portion being a tubular member of which one end portion is in contact with the liquid containing portion, a accommodation portion and has a bottom wall that is a wall portion facing the printing apparatus when the cartridge is mounted in the printing apparatus, and the bottom wall includes an opening portion that faces another end portion of the liquid supply portion with a gap formed therebetween or that is in contact with the other end portion, the opening portion forming an opening into which the liquid introduction portion is inserted, an exposed surface continuous with the opening portion and exposed to an outside, and one or more projecting portions formed on the exposed surface.

7 Claims, 18 Drawing Sheets

CARTRIDGE

The present application is based on, and claims priority from JP Application Serial Number 2023-171795, filed Oct. 3, 2023, the disclosure of which is hereby incorporated by reference herein in its entirety.

BACKGROUND

1. Technical Field

The present disclosure relates to a cartridge.

2. Related Art

In the related art, there is a cartridge including a liquid containing portion that contains ink to be supplied to a printer. The cartridge is mounted in and removed from the printer. The liquid containing portion includes a liquid supply portion that supplies ink to the printer. In the cartridge of JP-A-2022-154024, a liquid supply portion is accommodated in an arrangement portion connected to a liquid containing portion. The arrangement portion has a bottom wall that is a surface facing the printer when the cartridge is mounted in the printer. The cartridge of JP-A-2022-154024 includes a liquid absorbing member on the bottom wall of the arrangement portion. As the liquid absorbing member, a porous body formed of urethane foam or polyvinyl alcohol, a member formed of a non-woven fabric, or the like is used. In the cartridge of JP-A-2022-154024, an opening portion into which a liquid introduction portion of the printer is inserted is formed in the bottom wall of the arrangement portion. A part of the liquid absorbing member is exposed from the opening portion, and other parts are disposed inside the bottom wall. In the cartridge of JP-A-2022-154024, in a case where ink is scattered from the liquid introduction portion toward the opening portion in a process in which the cartridge is removed from the printer, the liquid absorbing member exposed from the opening portion can capture the ink.

For environmental protection, a cartridge may be reused. In order to reuse the cartridge of JP-A-2022-154024, the liquid absorbing member that absorbs ink needs to be replaced. In order to replace the liquid absorbing member, the cartridge needs to be disassembled, and the efficiency of work may be decreased.

SUMMARY

According to an aspect of the present disclosure, there is provided a cartridge to be mounted in a printing apparatus including a liquid introduction portion. The cartridge includes a liquid containing body that contains a liquid, and an accommodation portion connected to the liquid containing body, and the liquid containing body includes a liquid containing portion that is formed inside the liquid containing body and that contains a liquid, and a liquid supply portion capable of supplying the liquid contained in the liquid containing portion to the printing apparatus by being connected to the liquid introduction portion, the liquid supply portion being a tubular member of which one end portion is in contact with the liquid containing portion, the accommodation portion accommodates a part of the liquid supply portion therein, and has a bottom wall that is a wall portion facing the printing apparatus when the cartridge is mounted in the printing apparatus, and the bottom wall includes an opening portion that faces another end portion of the liquid supply portion with a gap formed therebetween or that is in contact with the other end portion, the opening portion forming an opening into which the liquid introduction portion is inserted, an exposed surface continuous with the opening portion and exposed to an outside, and one or more projecting portions formed on the exposed surface.

DESCRIPTION OF EMBODIMENTS

A. First Embodiment

Figure 1:
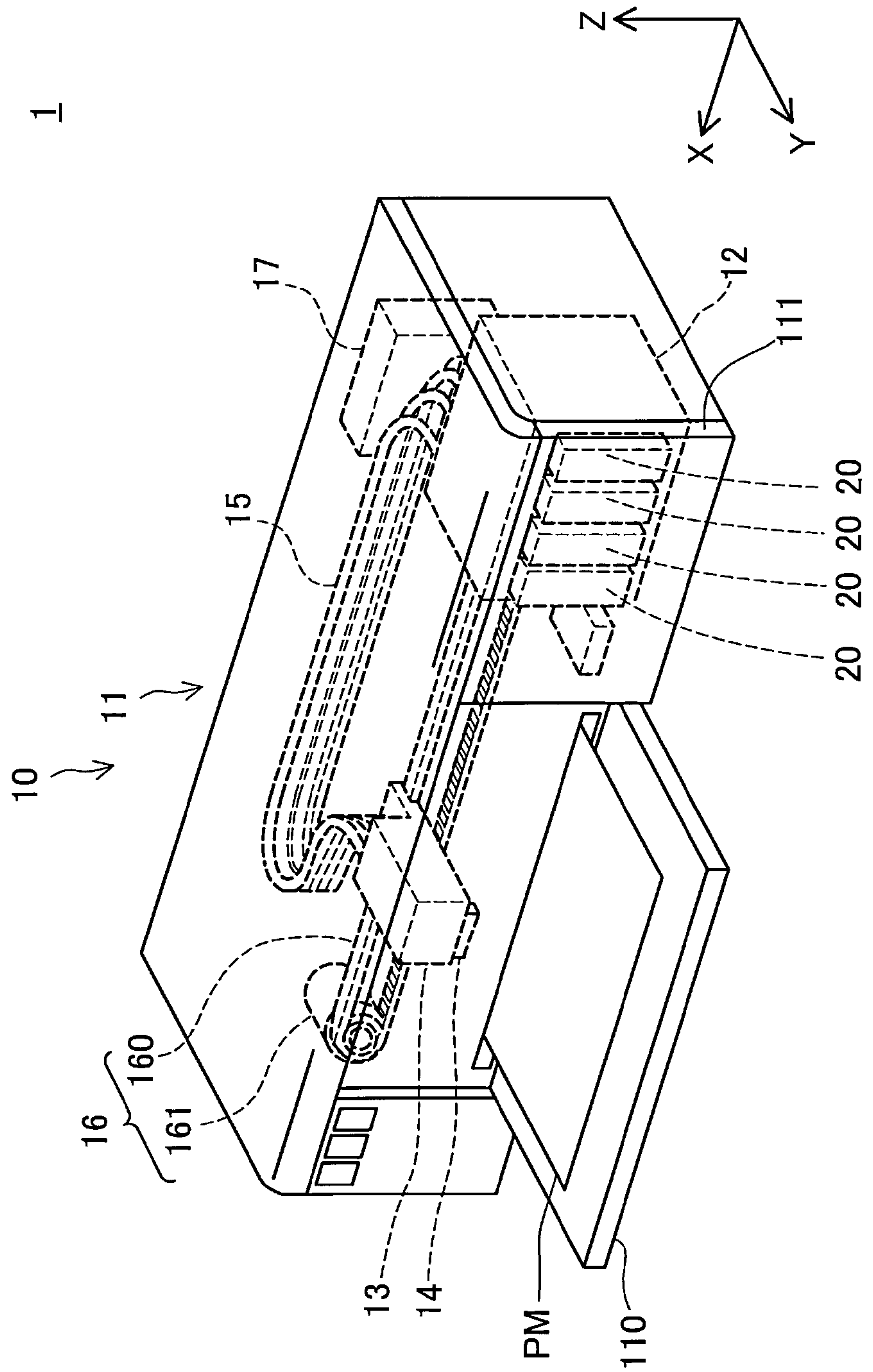
FIG. 1 is a view illustrating a configuration of a printing system according to a first embodiment of the present disclosure.

A1. Configuration of First Embodiment:

FIG. 1 is a diagram illustrating a configuration of a printing system 1 according to a first embodiment of the present disclosure. In FIG. 1, an X axis, a Y axis, and a Z axis, which are three spatial axes orthogonal to each other, are drawn. The directions in which the arrows of the X axis, the Y axis, and the Z axis are directed indicate positive directions along the X axis, the Y axis, and the Z axis, respectively. The positive directions along the X axis, the Y axis, and the Z axis are defined as a +X direction, a +Y direction, and a +Z direction, respectively. Directions opposite to the directions in which the arrows of the X axis, the Y axis, and the Z axis are directed are negative directions along the X axis, the Y axis, and the Z axis, respectively. The negative directions along the X axis, the Y axis, and the Z axis are defined as a −X direction, a −Y direction, and a −Z direction, respectively. Directions along the X axis, the Y axis, and the Z axis regardless of whether being positive or negative are referred to as an X direction, a Y direction, and a Z direction, respectively. The same applies to the following drawings and description. The X axis and the Y axis are axes along a horizontal plane, and the Z axis is an axis along the gravity direction.

The printing system 1 performs printing on a print medium PM by using ink. In the present embodiment, the printing system 1 performs printing using a plurality of inks. The printing system 1 includes a printing apparatus 10 and four cartridges 20. The printing apparatus 10 is an ink jet printer that performs printing on the print medium PM by discharging ink as a liquid. The cartridges 20 can be mounted in or removed from the printing apparatus 10. As illustrated in FIG. 1, the printing apparatus 10 is used in a state of being disposed on a horizontal surface. The printing apparatus 10 includes an accommodation box 11, a cartridge mounting portion 12, a carriage 13, a discharge head 14, a tube 15, a drive mechanism 16, and a control unit 17.

The accommodation box 11 accommodates the cartridge mounting portion 12, the carriage 13, the discharge head 14, the drive mechanism 16, the control unit 17, and the cartridges 20. The accommodation box 11 has a substantially rectangular parallelepiped shape. The accommodation box 11 includes a front cover 110 and a replacement cover 111. The front cover 110 is a portion on which the print medium PM on which printing is completed is disposed. The front cover 110 is provided on a wall on the +Y direction side of the accommodation box 11. The front cover 110 is a plate-like member extending in the X direction and the Y direction. The replacement cover 111 is opened and closed when the cartridges 20 are mounted in and removed from the cartridge mounting portion 12 by the user. The replacement cover 111 is a part of the wall on the +Y direction side of the accommodation box 11.

Each cartridge 20 is inserted into or removed from the cartridge mounting portion 12 in the Y direction by the user. In detail, the cartridge 20 is inserted into the cartridge mounting portion 12 in the −Y direction by the user. In addition, the cartridge 20 is pulled out in the +Y direction by the user with respect to the cartridge mounting portion 12. The cartridge mounting portion 12 supplies ink supplied from the cartridge 20 to the discharge head 14 via the tube 15 illustrated in FIG. 1. The cartridge mounting portion 12 is positioned on the −Y direction side of the replacement cover 111 inside the accommodation box 11. In the present embodiment, four cartridges 20 can be mounted in the cartridge mounting portion 12.

Figure 2:
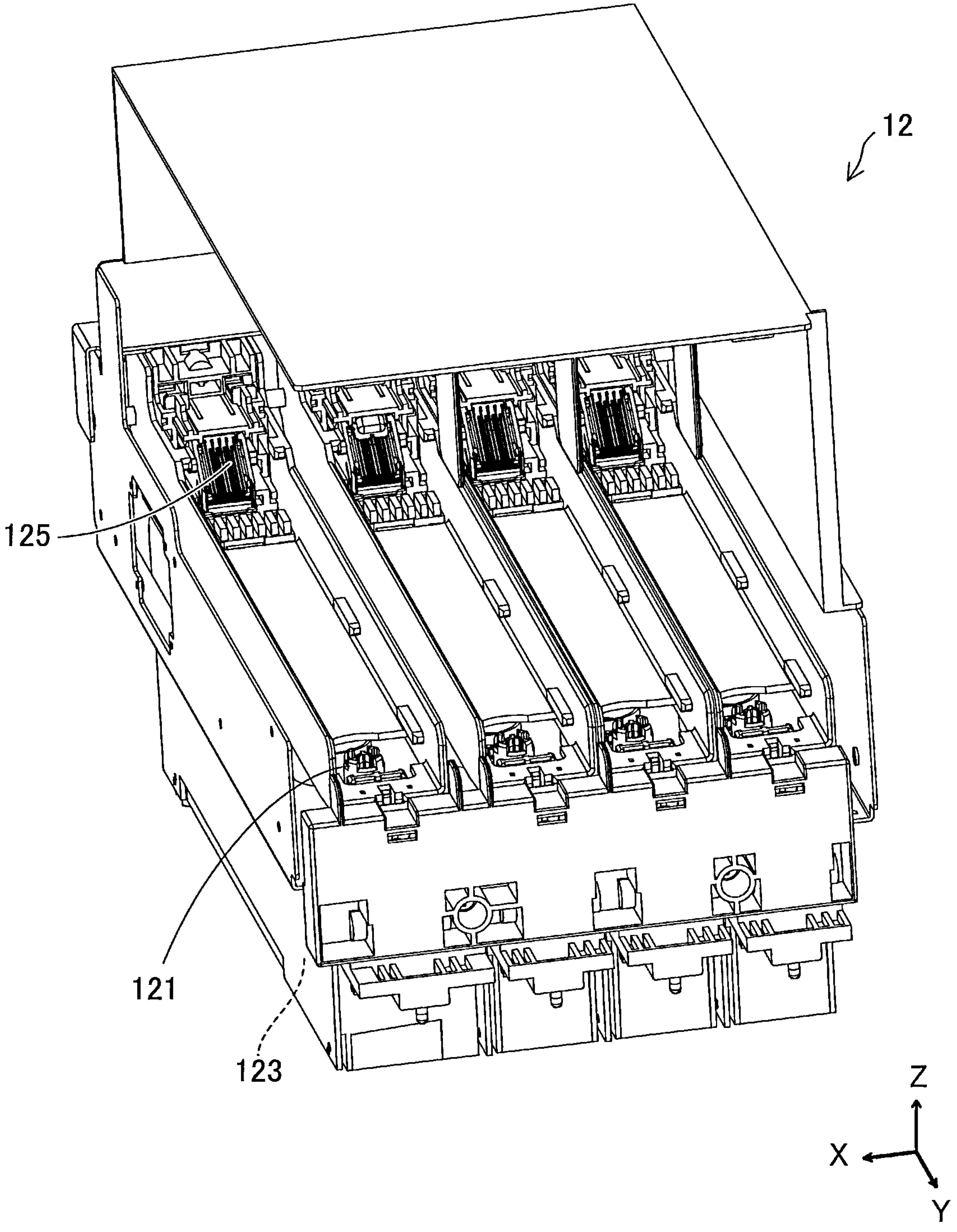
FIG. 2 is a view for explaining a cartridge mounting portion.

FIG. 2 is a view for explaining the cartridge mounting portion 12. In FIG. 2, a part of the cartridge mounting portion 12 and the cartridges 20 are not illustrated. In the present embodiment, each cartridge 20 is inserted into or removed from the cartridge mounting portion 12 in the Y direction by the user. In detail, the cartridge 20 is inserted into the cartridge mounting portion 12 in the −Y direction by the user. In addition, the cartridge 20 is pulled out in the +Y direction by the user with respect to the cartridge mounting portion 12.

The cartridge mounting portion 12 supplies ink supplied from the cartridge 20 to the discharge head 14 via the tube 15 illustrated in FIG. 1. The cartridge mounting portion 12 is positioned on the −Y direction side of the replacement cover 111 inside the accommodation box 11. As illustrated in FIG. 2, the cartridge mounting portion 12 includes four liquid introduction portions 121, four liquid reservoirs 123, and four apparatus-side terminal portions 125. In FIG. 2, one liquid introduction portion 121, one liquid reservoir 123, and one apparatus-side terminal portion 125 are denoted by reference numerals.

Figure 3:
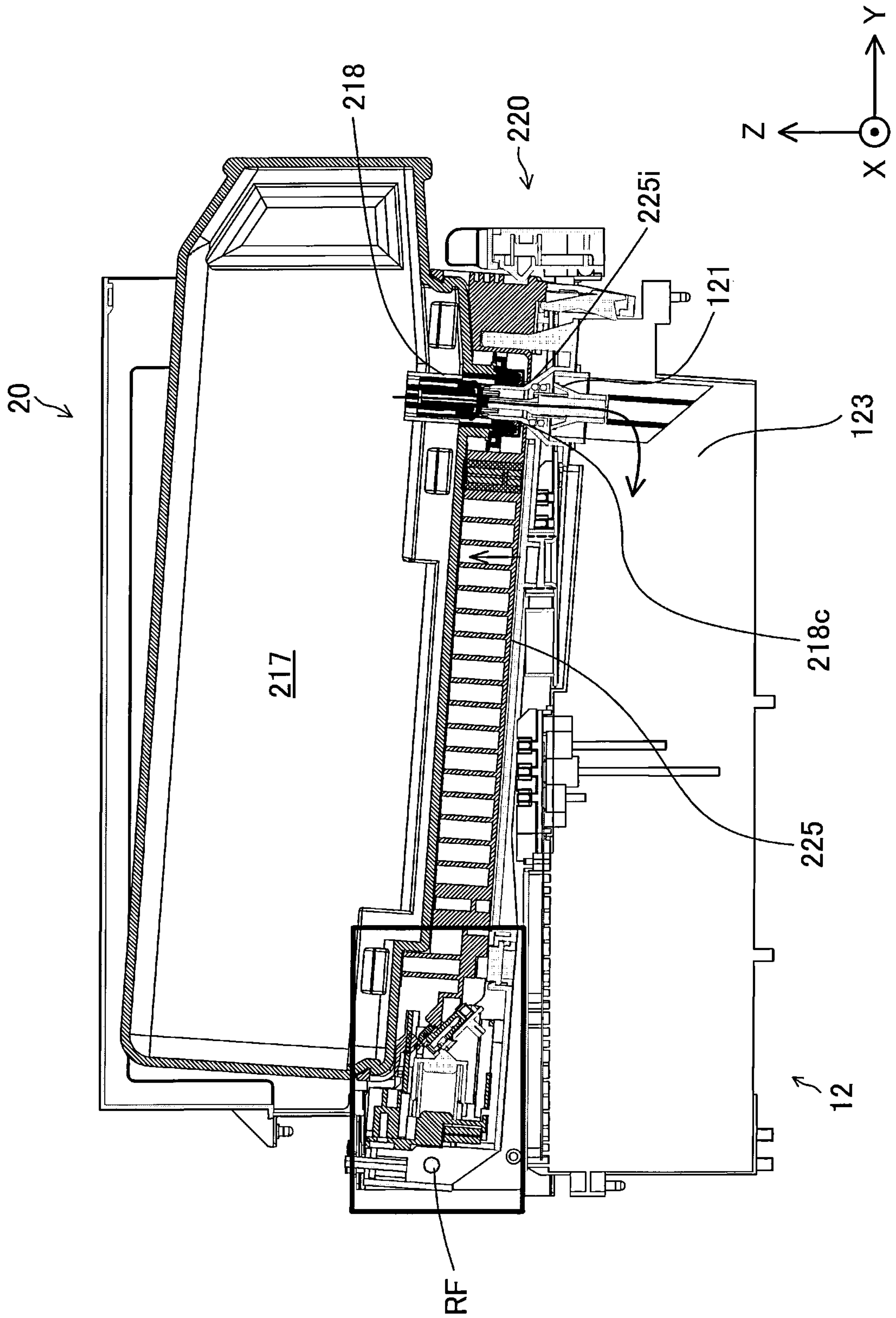
FIG. 3 is a sectional view for explaining a mounted state in which mounting of a cartridge in the cartridge mounting portion is completed.

FIG. 3 is a sectional view illustrating a mounted state in which mounting of the cartridge 20 in the cartridge mounting portion 12 is completed. More specifically, FIG. 3 is a cross section that passes through a center of the liquid introduction portion 121 positioned on the most +X direction side in FIG. 2. Here, the liquid introduction portion 121 will be described with reference to FIG. 3. The liquid introduction portion 121 receives ink supplied from a liquid supply portion 218 of the cartridge 20. The liquid supply portion 218 will be described later. The liquid introduction portion 121 is a tubular member. The liquid introduction portion 121 includes a flow path through which ink flows. The liquid introduction portion 121 is connected to the liquid reservoir 123, and a liquid that has flowed through the flow path flows through the liquid reservoir 123 through the liquid introduction portion 121.

The liquid reservoir 123 illustrated in FIG. 2 reserves the ink received from the cartridge 20 via the liquid introduction portion 121. The liquid reservoir 123 is in communication with the discharge head 14 via the tube 15 illustrated in FIG. 1. The apparatus-side terminal portion 125 is electrically connected to a circuit board 23 of the cartridge 20 by coming into contact with the circuit board 23 in a state in which the cartridge 20 is mounted in the cartridge mounting portion 12. The circuit board 23 will be described later. The apparatus-side terminal portion 125 is electrically connected to the control unit 17 of FIG. 1 by wiring (not illustrated). This enables data communication between the circuit board 23 and the control unit 17.

The carriage 13 illustrated in FIG. 1 relatively moves the discharge head 14 with respect to the print medium PM. Specifically, the carriage 13 moves the discharge head 14 by reciprocating in the X direction. The discharge head 14 discharges ink toward the print medium PM to print data such as characters and images on the print medium PM. The tube 15 circulates ink in the liquid reservoir 123 of the cartridge mounting portion 12 and supplies the ink to the discharge head 14.

The drive mechanism 16 reciprocates the carriage 13 in the X direction based on a control signal from the control unit 17. The drive mechanism 16 includes a timing belt 160 and a drive motor 161. The timing belt 160 transmits power of the drive motor 161 to the carriage 13. The drive motor 161 rotates the timing belt 160. The control unit 17 controls each unit of the printing apparatus 10 and transmits and receives signals to and from the cartridge 20.

Figure 4:
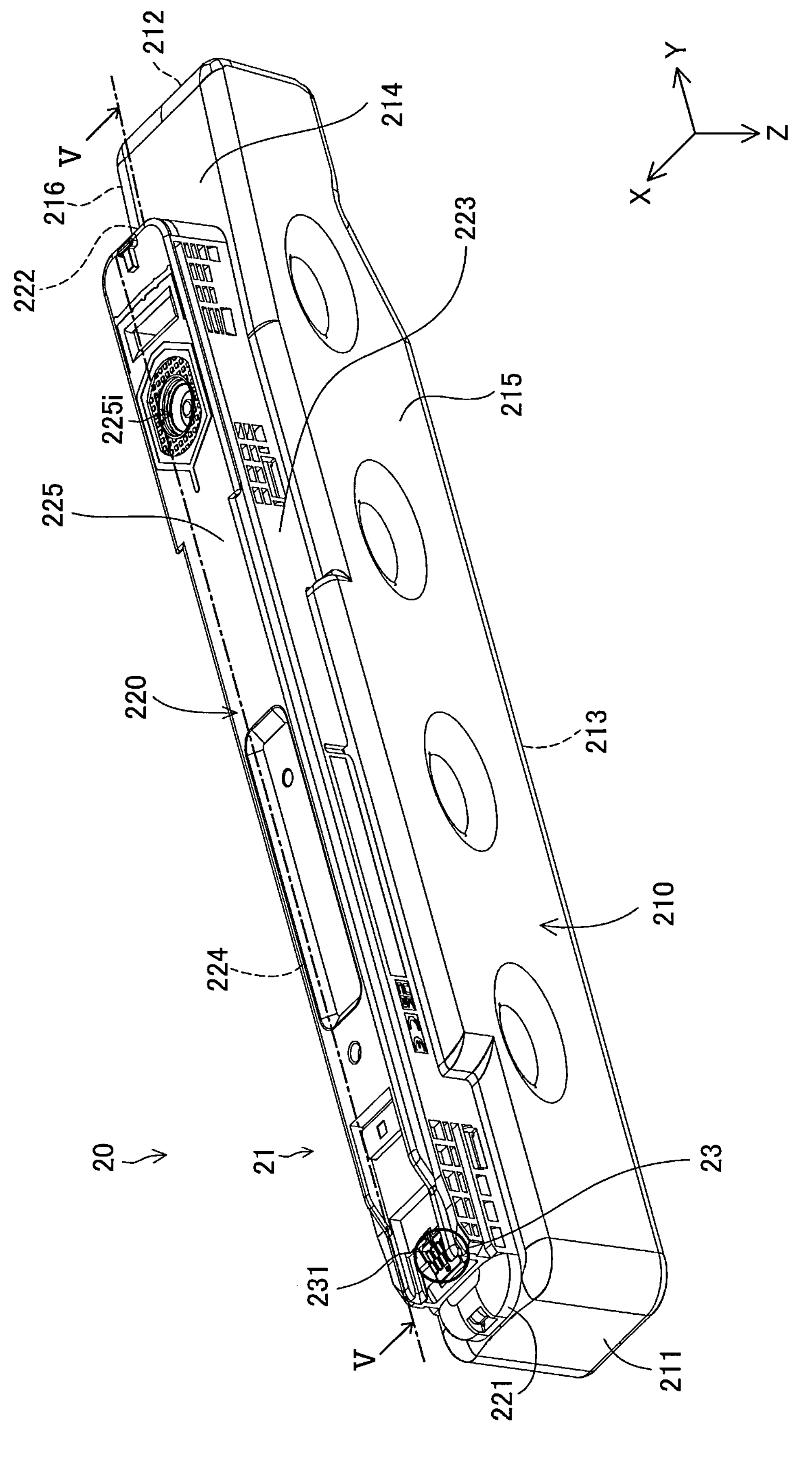
FIG. 4 is a perspective view of the cartridge of the first embodiment.

FIG. 4 is a perspective view of the cartridge 20 according to the first embodiment. The cartridge 20 contains ink to be supplied to the printing apparatus 10. The cartridge 20 is configured to be mounted in and removed from the printing apparatus 10. As illustrated in FIG. 1, in the present embodiment, four cartridges 20 are mounted in the printing apparatus 10. The four cartridges 20 all have the same shape. The cartridges 20 each have a substantially rectangular parallelepiped shape. In the cartridge 20, the X direction is a lateral direction of the cartridge 20, the Y direction is a longitudinal direction, and the Z direction is a height direction. In the cartridge 20, the dimension in the longitudinal direction is the largest, and the dimension in the lateral direction is the smallest. As illustrated in FIG. 4, the cartridge 20 includes a cartridge main body 21 and the circuit board 23.

Figure 5:
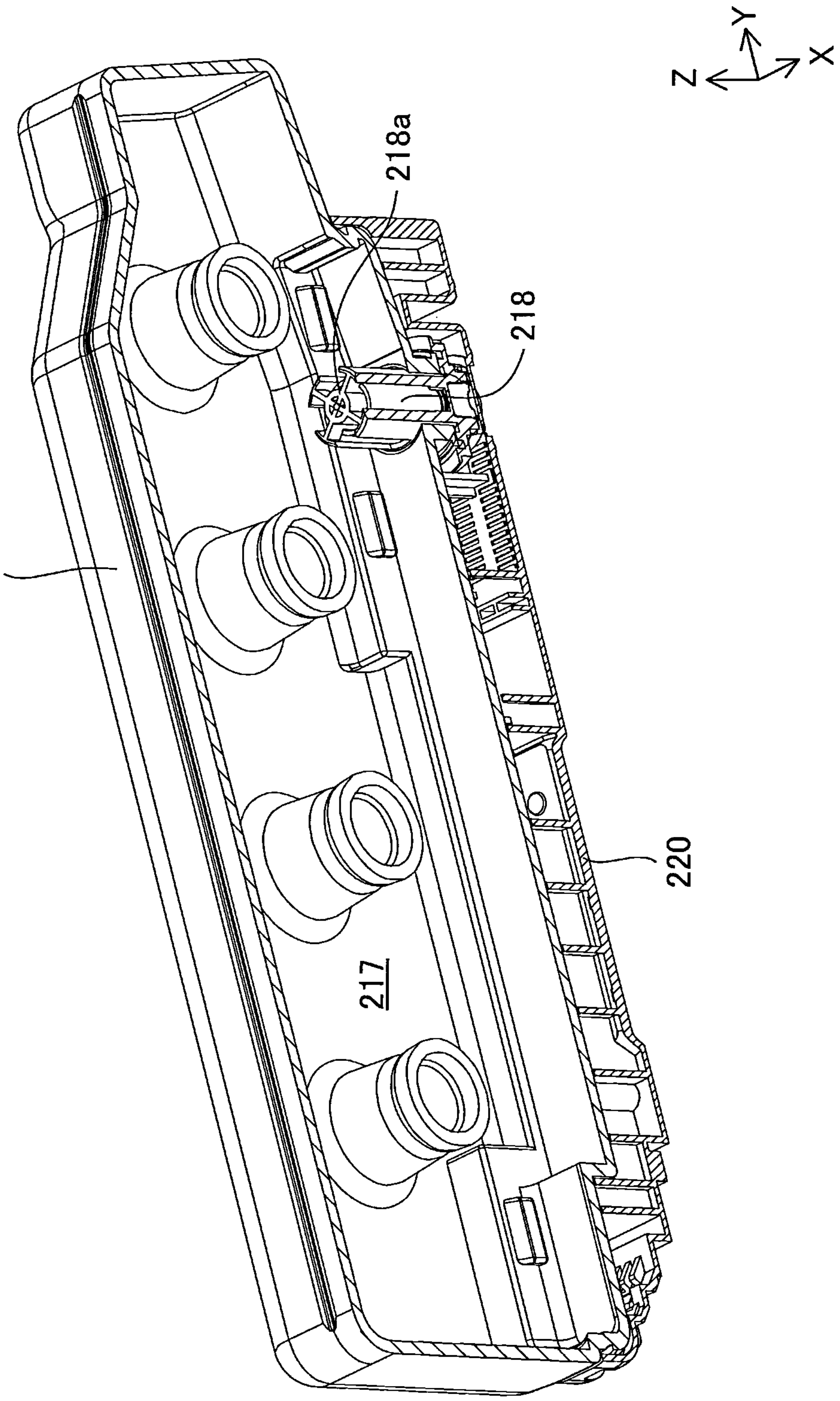
FIG. 5 is a perspective view of the cartridge taken along line V-V in FIG. 4.

FIG. 5 is a perspective view of the cartridge 20 taken along line V-V in FIG. 4. As illustrated in FIG. 4, the cartridge main body 21 includes a liquid containing body 210 and an accommodation portion 220. The liquid containing body 210 contains ink, which is a liquid. The liquid containing body 210 has a substantially rectangular parallelepiped shape. The liquid containing body 210 is formed by injection molding using polypropylene as a material. As illustrated in FIGS. 4 and 5, the liquid containing body 210 includes a front wall 211, a rear wall 212, an upper wall 213, a containing body bottom wall 214, a first side wall 215, a second side wall 216, a liquid containing portion 217, and the liquid supply portion 218. The front wall 211 forms a wall portion on the −Y direction side of the liquid containing body 210. The rear wall 212 forms a wall portion on the +Y direction side of the liquid containing body 210. The rear wall 212 faces the front wall 211 in the Y direction. The upper wall 213 forms a wall portion on the +Z direction side of the liquid containing body 210. The containing body bottom wall 214 forms a wall portion on the −Z direction side of the liquid containing body 210. The containing body bottom wall 214 faces the upper wall 213 in the Z direction. The first side wall 215 forms a wall portion on the −X direction side of the liquid containing body 210. The second side wall 216 forms a wall portion on the +X direction side of the liquid containing body 210. The second side wall 216 faces the first side wall 215 in the X direction. The liquid containing portion 217 illustrated in FIG. 5 contains ink. The liquid containing portion 217 is formed inside the liquid containing body 210.

Ink in the liquid containing portion 217 can flow into the printing apparatus 10 through the liquid supply portion 218. Specifically, as illustrated in FIG. 3, the liquid supply portion 218 is connected to the liquid introduction portion 121 of the cartridge mounting portion 12, and thus can supply the ink contained in the liquid containing portion 217 to the discharge head 14 of the printing apparatus 10 illustrated in FIG. 1 via the liquid introduction portion 121. As illustrated in FIG. 3, the liquid supply portion 218 is connected to the liquid introduction portion 121 in a state in which the cartridge 20 is mounted in the cartridge mounting portion 12. The liquid supply portion 218 is a tubular member. The liquid supply portion 218 is provided with a valve mechanism that opens when the liquid introduction portion 121 is inserted into an accommodation opening 225*i*, which is an opening of the accommodation portion 220, and closes when the liquid introduction portion 121 is not inserted into the accommodation opening 225*i*. The accommodation opening 225*i* will be described later. Although not illustrated, the liquid supply portion 218 has packing inside. In a state in which the liquid introduction portion 121 is inserted, a portion between the liquid introduction portion 121 and the liquid supply portion 218 is sealed by the packing. Accordingly, it is possible to prevent the ink inside the liquid containing portion 217 from leaking from a gap between the liquid supply portion 218 and the liquid introduction portion 121.

Figure 6:
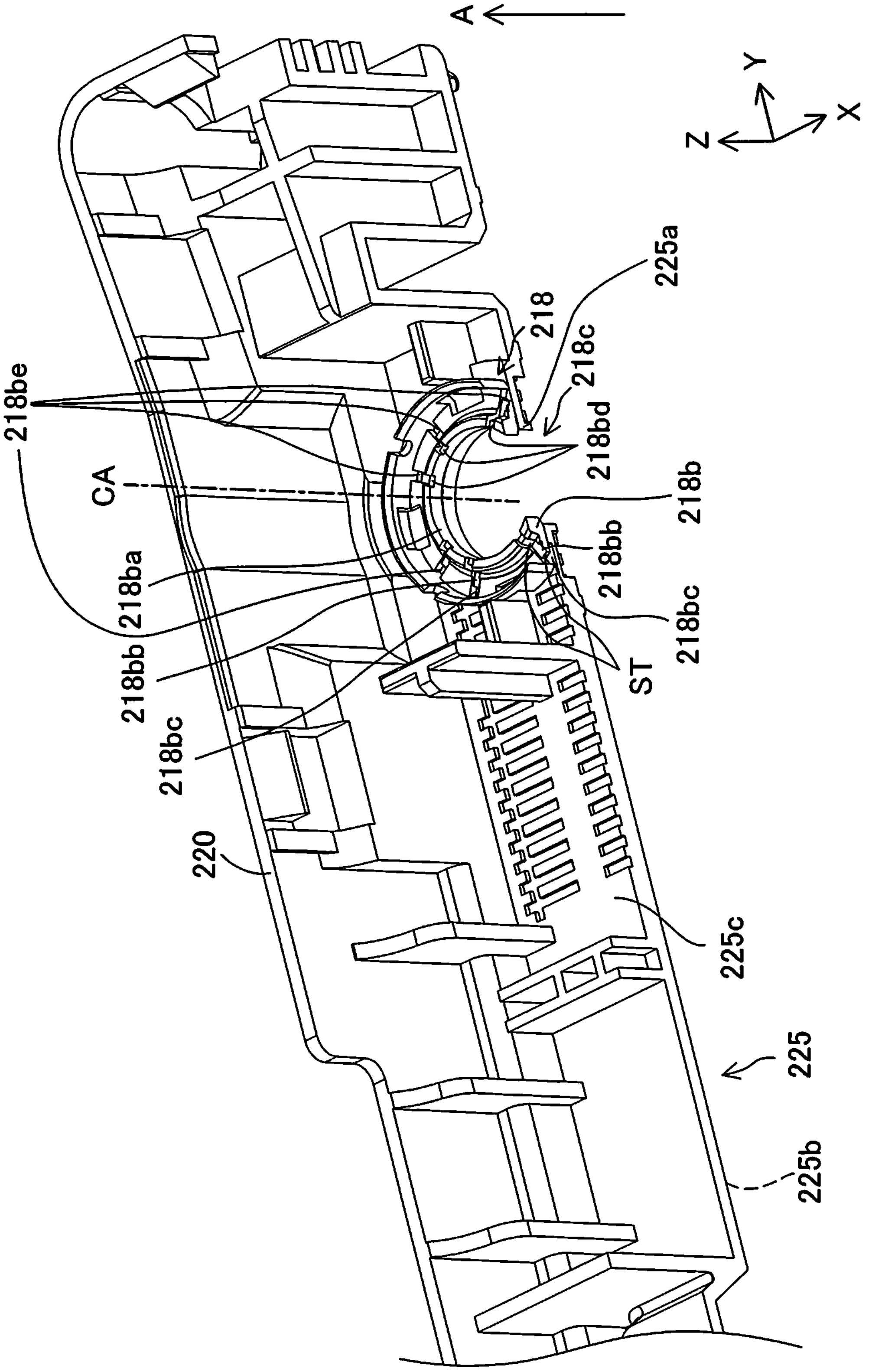
FIG. 6 is a view for explaining a second supply portion end portion of a liquid supply portion.

FIG. 6 is a view for explaining a second supply portion end portion 218*b* of the liquid supply portion 218. In FIG. 6, hatching is omitted. In FIG. 6, the liquid containing body 210 in FIG. 5 and a part of the liquid supply portion 218 are not illustrated. As illustrated in FIG. 5, a first supply portion end portion 218*a*, which is one end portion of the liquid supply portion 218, is in contact with the liquid containing portion 217. As illustrated in FIG. 6, in the liquid supply portion 218, the second supply portion end portion 218*b*, which is another end portion, is in contact with an inner wall surface 225*c* of an accommodation bottom wall 225 of the accommodation portion 220 and an accommodation opening portion 225*a* continuous with the inner wall surface 225*c*. The accommodation bottom wall 225, the accommodation opening portion 225*a*, and the inner wall surface 225*c* of the accommodation portion 220 will be described later. As illustrated in FIG. 6, the second supply portion end portion 218*b* includes an end portion opening portion 218*ba*, two end portion grooves 218*bb*, two end portion holes 218*bc*, six end portion second grooves 218*bd*, and six end portion second holes 218*be*. In FIG. 6, two end portion second grooves 218*bd* and two end portion second holes 218*be* are not illustrated.

As illustrated in FIG. 6, the end portion opening portion 218*ba* forms an end portion opening 218*c*, which is an opening for guiding the ink in the liquid containing portion 217 to the outside. The end portion opening 218*c* passes through a central axis CA of the liquid supply portion 218. As illustrated in FIG. 3, the end portion opening 218*c* receives the liquid introduction portion 121, which has passed through the accommodation opening 225*i*, in the liquid supply portion 218. The ink in the liquid containing portion 217 is guided to the printing apparatus 10, which is the outside of the cartridge 20, via the liquid introduction portion 121.

The end portion grooves 218*bb* illustrated in FIG. 6 are portions through which leaked ink flows when the ink leaks from a gap between the packing (not illustrated) of the liquid supply portion 218 and the liquid introduction portion 121. The liquid supply portion 218 is formed so that the ink flows into the end portion grooves 218*bb* when the ink leaks from the gap between the packing of the liquid supply portion 218 and the liquid introduction portion 121. The end portion grooves 218*bb* are formed continuously with the end portion opening portion 218*ba*. In the end portion grooves 218*bb*, two steps ST are formed from the end portion opening 218*c* side toward an outer periphery of the second supply portion end portion 218*b*. Specifically, steps are formed so as to descend in the −Z direction from the end portion opening 218*c* side toward the outer periphery of the second supply portion end portion 218*b*. In a state in which the cartridge 20 is disposed such that the second supply portion end portion 218*b* is on a lower side in a vertical direction with respect to the first supply portion end portion 218*a* illustrated in FIG. 5, the end portion grooves 218*bb* are formed such that when ink leaks from the gap between the packing and the liquid introduction portion 121, the ink flows downward in the vertical direction as illustrated in FIG. 6. In the present embodiment, the two end portion grooves 218*bb* are formed.

The end portion holes 218*bc* are holes formed in the end portion grooves 218*bb*. More specifically, each end portion hole 218*bc* is a hole formed at an end of each end portion groove 218*bb*. The end portion hole 218*bc* is formed at a position close to the outer periphery of the second supply portion end portion 218*b* with respect to the end portion opening 218*c*. The end portion hole 218*bc* extends through the second supply portion end portion 218*b* in the Z direction. In a state in which the cartridge 20 is disposed such that the second supply portion end portion 218*b* is on a lower side in the vertical direction with respect to the first supply portion end portion 218*a*, when ink flows through the end portion groove 218*bb*, the ink flows out to the outside of the liquid supply portion 218 through the end portion hole 218*bc*. In the present embodiment, when projected in a direction A, which is a direction from the exposed surface

225*b* toward the inner wall surface 225*c*, the end portion hole 218*bc* overlaps with a first recessed portion 225*d* or a second recessed portion 225*e* of the accommodation bottom wall 225. The overlap between the end portion hole 218*bc* and the first recessed portion 225*d* or the second recessed portion 225*e* and the exposed surface 225*b* will be described later.

The end portion second grooves 218*bd* each have the same configuration as the end portion groove 218*bb*. The end portion second holes 218*be* are holes formed in the end portion second grooves 218*bd*. The end portion second holes 218*be* each have the same configuration as the end portion hole 218*bc*. When projected in the direction A, which is a direction from the exposed surface 225*b* toward the inner wall surface 225*c*, the end portion second hole 218*be* is different from the end portion hole 218*bc* in that the end portion second hole 218*be* does not overlap with the first recessed portion 225*d* or the second recessed portion 225*e* of the accommodation bottom wall 225.

As illustrated in FIG. 5, the accommodation portion 220 accommodates a part of the liquid supply portion 218 therein. The accommodation portion 220 is connected to the liquid containing portion 217. In the present embodiment, the accommodation portion 220 is connected to the liquid containing portion 217 by fitting. The accommodation portion 220 has a substantially rectangular parallelepiped shape of which the +Z direction side is opened. The accommodation portion 220 is formed by injection molding using polypropylene as a material. As illustrated in FIG. 4, the accommodation portion 220 includes an accommodation front wall 221, an accommodation rear wall 222, a first accommodation side wall 223, a second accommodation side wall 224, and the accommodation bottom wall 225.

The accommodation front wall 221 forms a wall portion on the −Y direction side of the accommodation portion 220. The accommodation rear wall 222 forms a wall portion on the +Y direction side of the accommodation portion 220. The accommodation rear wall 222 faces the accommodation front wall 221 in the Y direction. The first accommodation side wall 223 forms a wall portion on the −X direction side of the accommodation portion 220. The first accommodation side wall 223 intersects with the accommodation bottom wall 225 and extends in the Y direction, which is a longitudinal direction of the accommodation portion 220. The first accommodation side wall 223 extends from the accommodation bottom wall 225 toward the liquid containing body 210. The second accommodation side wall 224 faces the first accommodation side wall 223 in the X direction, which is a lateral direction of the accommodation portion 220. The second accommodation side wall 224 intersects with the accommodation bottom wall 225 and extends in the Y direction, which is the longitudinal direction of the accommodation portion 220.

Figure 7:
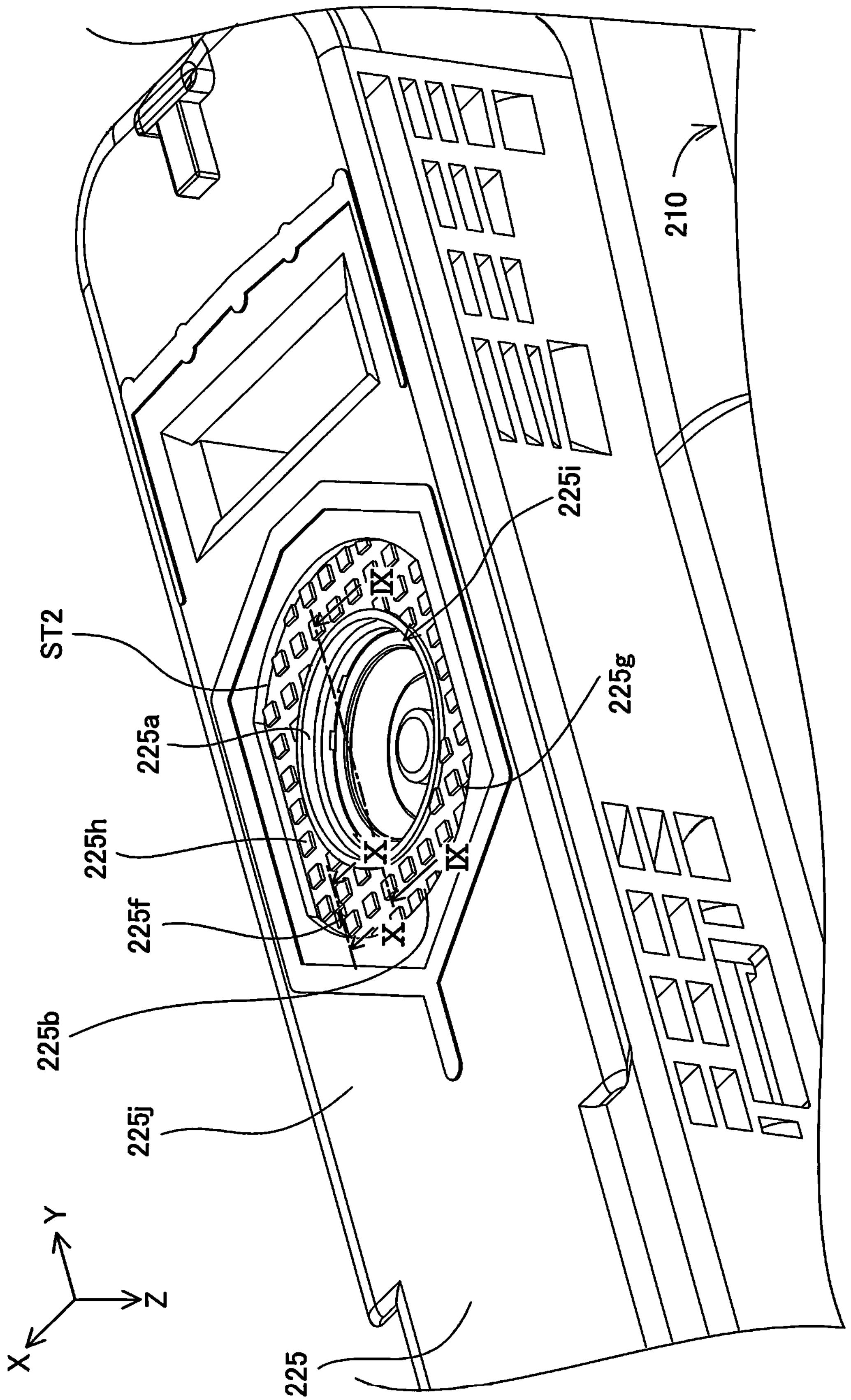
FIG. 7 is a view for explaining an accommodation bottom wall.
Figure 8:
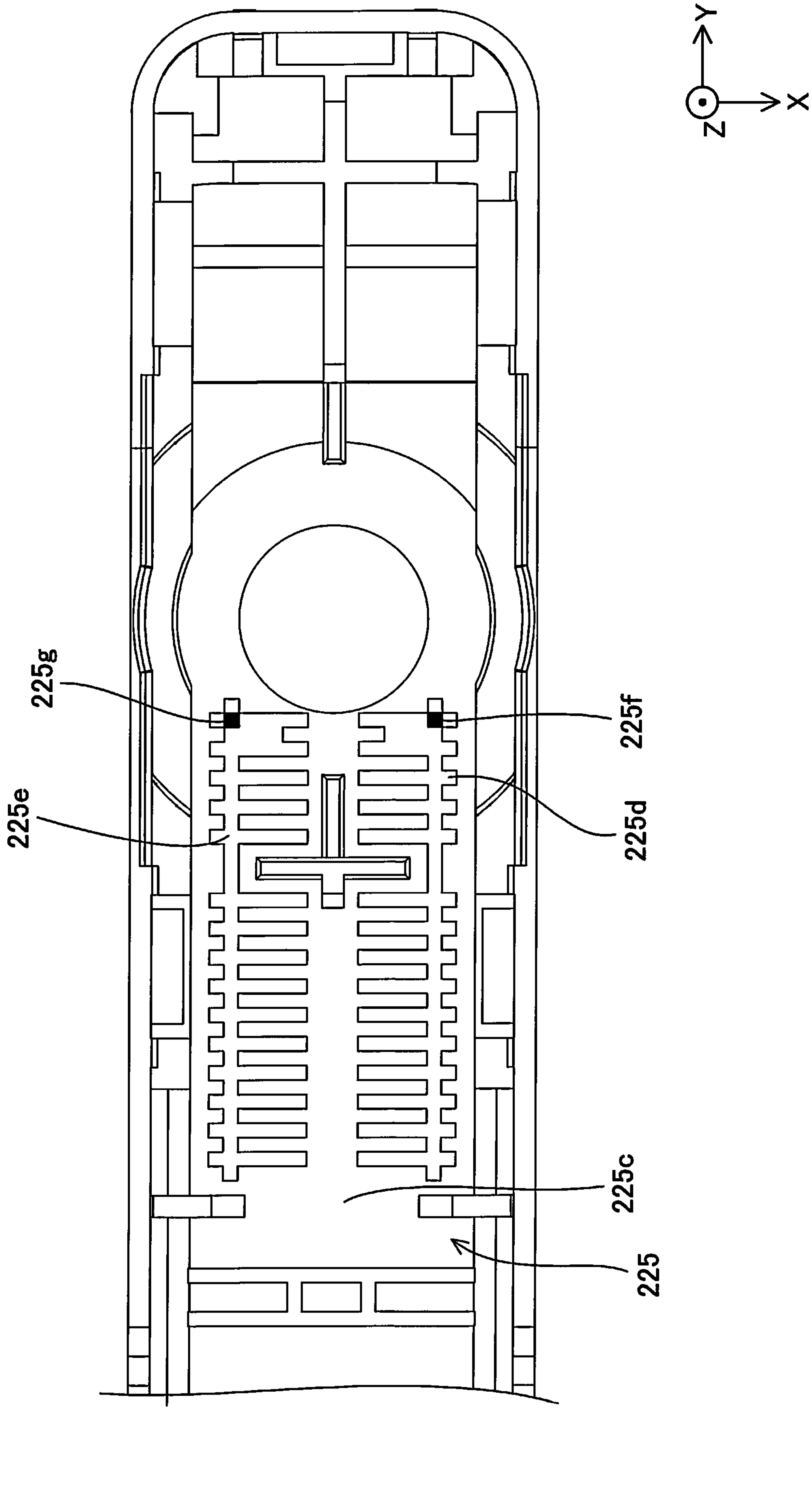
FIG. 8 is a view for explaining an inner wall surface.

FIG. 7 is a view for explaining the accommodation bottom wall 225. FIG. 7 is an enlarged view of a part of FIG. 4. FIG. 8 is a view for explaining the inner wall surface 225*c*. In FIG. 8, the liquid containing body 210 is not illustrated. As illustrated in FIG. 3, the accommodation bottom wall 225 is a wall portion that faces the printing apparatus 10 when the cartridge 20 is mounted in the cartridge mounting portion 12 of the printing apparatus 10. Mounting of the cartridge 20 in the printing apparatus 10 will be described later. As illustrated in FIG. 4, the accommodation bottom wall 225 forms a wall portion on the −Z direction side of the accommodation portion 220. The accommodation bottom wall 225 is formed of a single material. In the present embodiment, the accommodation bottom wall 225 is formed of polypropylene. As illustrated in FIGS. 7 and 8, the accommodation bottom wall 225 includes the accommodation opening portion 225*a*, the exposed surface 225*b*, the inner wall surface 225*c*, the first recessed portion 225*d* and the second recessed portion 225*e*, which are two recessed portions, a first communication hole 225*f* and a second communication hole 225*g*, which are two communication holes, and a plurality of projecting portions 225*h*. In FIG. 8, the first communication hole 225*f* and the second communication hole 225*g* are illustrated in black.

The accommodation opening portion 225*a* forms the accommodation opening 225*i* that is an opening into which the liquid introduction portion 121 of the printing apparatus 10 is inserted. The accommodation opening portion 225*a* is formed continuously with the exposed surface 225*b*. The accommodation opening portion 225*a* has a substantially circular shape when viewed in the Z direction. As illustrated in FIG. 3, when the cartridge 20 is mounted in the printing apparatus 10, the liquid introduction portion 121 is inserted into the accommodation opening 225*i* and is received in the end portion opening 218*c* of the liquid supply portion 218, whereby the liquid introduction portion 121 and the liquid supply portion 218 are connected to each other.

The exposed surface 225*b* illustrated in FIG. 7 is a surface of the accommodation bottom wall 225 on which the plurality of projecting portions 225*h* is formed. The exposed surface 225*b* is continuous with the accommodation opening portion 225*a*. The exposed surface 225*b* is a part of surfaces, among the surfaces of the accommodation bottom wall 225, exposed to the outside. Here, of the surfaces of the accommodation bottom wall 225 exposed to the outside, surfaces other than the surfaces of the exposed surface 225*b* and the accommodation opening portion 225*a* are referred to as a discontinuous surface 225*j*. In the present embodiment, a step ST2 is formed between the exposed surface 225*b* and the discontinuous surface 225*j*. When viewed in the X and Y directions, the exposed surface 225*b* is formed on the +Z direction side with respect to a portion of the discontinuous surface 225*j* continuous with the step ST2.

Figure 9:
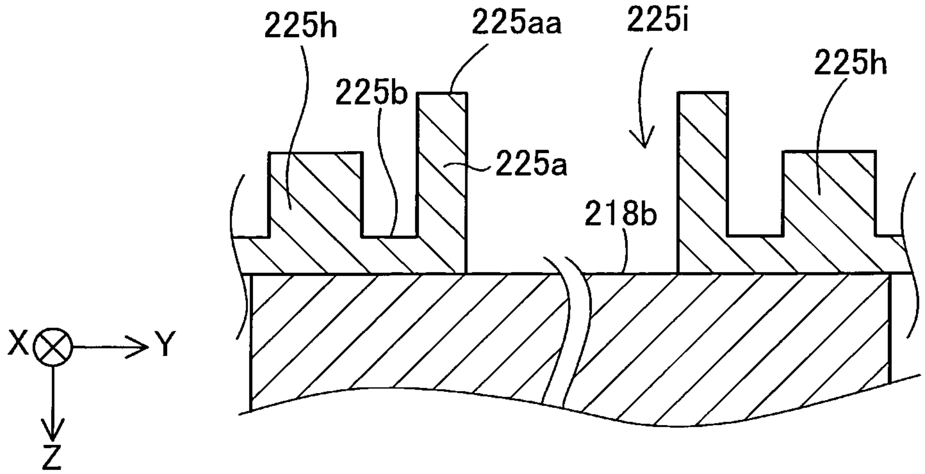
FIG. 9 is a sectional view taken along line IX-IX in FIG. 7.

FIG. 9 is a sectional view taken along line IX-IX of FIG. 7. In FIG. 9, illustration of the cartridge 20 is simplified. FIG. 9 is also a view illustrating a position of the exposed surface 225*b*. In the present embodiment, as illustrated in FIG. 9, the exposed surface 225*b* is formed at a position closer to the second supply portion end portion 218*b* than is an opening leading end portion 225*aa*, which is a portion of the accommodation opening portion 225*a*, farthest from the second supply portion end portion 218*b* of the liquid supply portion 218.

Figure 10:
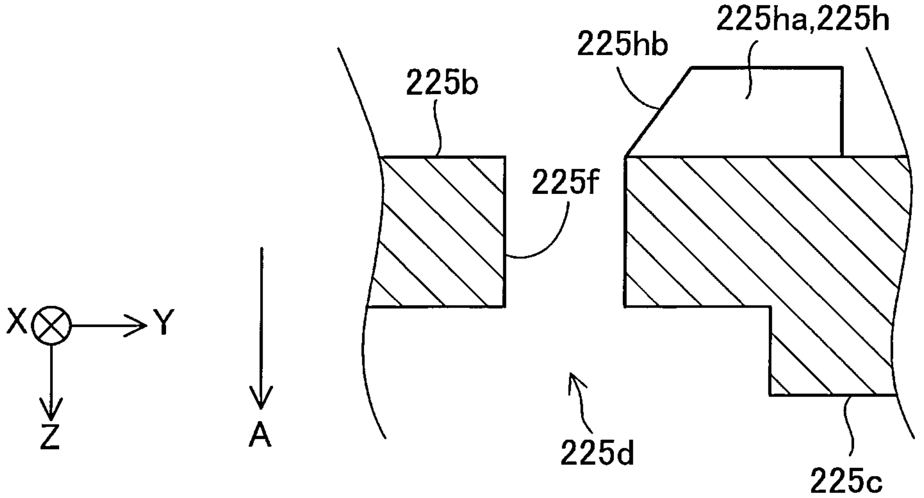
FIG. 10 is a sectional view taken along line X-X in FIG. 7.
Figure 11:
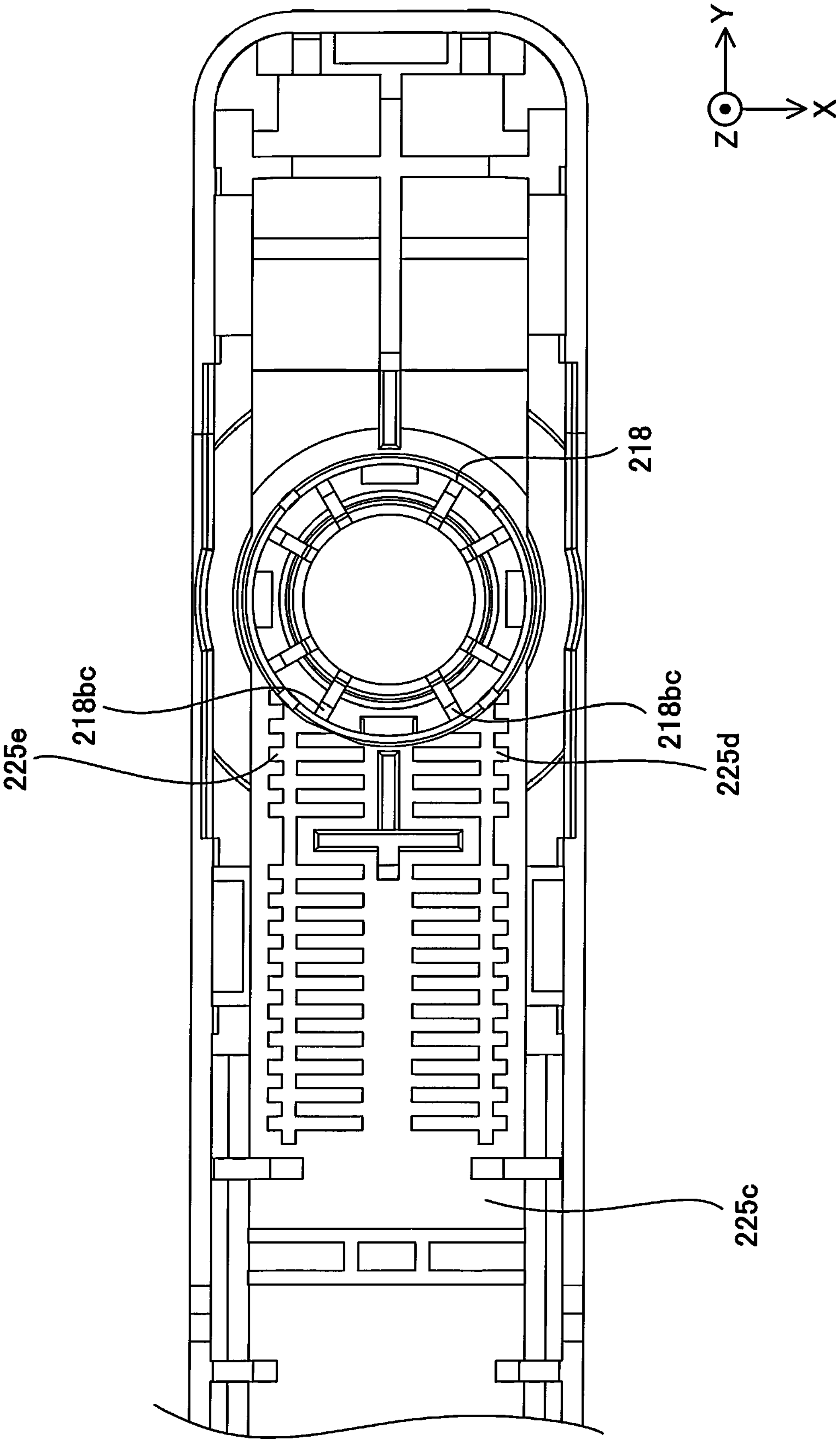
FIG. 11 is a view for explaining overlap between a first recessed portion and an end portion hole.

FIG. 10 is a sectional view taken along line X-X of FIG. 7. FIG. 11 is a view for explaining overlap between the first recessed portion 225*d* and the end portion hole 218*bc*. FIG. 11 is a view from another angle of a non-sectional view of FIG. 6 and is also a view in which a part of the liquid supply portion 218 is illustrated in FIG. 8. The inner wall surface 225*c* illustrated in FIG. 10 is a surface on a side opposite to the exposed surface 225*b* side in the Z direction and is a surface, of the accommodation bottom wall 225, not exposed to the outside. As illustrated in FIG. 6, the inner wall surface 225*c* is in contact with the second supply portion end portion 218*b* of the liquid supply portion 218. The first recessed portion 225*d* illustrated in FIG. 8 is a portion that holds ink flowing in from the exposed surface 225*b* through the first communication hole 225*f*. As illustrated in FIGS. 6 and 11, when projected in the direction A from the exposed surface 225*b* toward the inner wall surface 225*c*, one of the end portion holes 218*bc* of the liquid supply portion 218 and the first recessed portion 225*d* overlap with each other. The first recessed portion 225*d* is positioned on the +X direction side with respect to the second recessed portion 225*e*. As illustrated in FIGS. 8 and 10, the first recessed portion 225*d* is continuous with the first communication hole 225*f*. The first recessed portion 225*d* is formed in the inner wall surface 225*c*. In the present embodiment, as illustrated in FIG. 10, the first recessed portion 225*d* is recessed toward the exposed surface 225*b*. As illustrated in FIG. 8, the first recessed portion 225*d* extends along the inner wall surface 225*c*. In the present embodiment, the first recessed portion 225*d* extends in the Y direction.

The second recessed portion 225*e* has the same configuration as the first recessed portion 225*d*. Hereinafter, differences from the first recessed portion 225*d* will be described. As illustrated in FIG. 8, the second recessed portion 225*e* is connected to the second communication hole 225*g*. The second recessed portion 225*e* has a shape symmetrical to the first recessed portion 225*d* with respect to the Y direction. In the present embodiment, as illustrated in FIGS. 6 and 11, when projected in the direction A from the exposed surface 225*b* toward the inner wall surface 225*c*, one of the end portion holes 218*bc* of the liquid supply portion 218 and the second recessed portion 225*e* overlap with each other.

Through the first communication hole 225*f* illustrated in FIG. 7, the exposed surface 225*b* and the inner wall surface 225*c* are in communication with each other. Ink can flow into the first communication hole 225*f*. The first communication hole 225*f* is continuous with some of the plurality of projecting portions 225*h* and the first recessed portion 225*d*. Some of the plurality of projecting portions 225*h* will be described later. The second communication hole 225*g* has the same configuration as the first communication hole 225*f*. Hereinafter, differences from the first communication hole 225*f* will be described. The second communication hole 225*g* is continuous with some of the plurality of projecting portions 225*h* and the second recessed portion 225*e*. The projecting portions 225*h* with which the second communication hole 225*g* is continuous are different from the projecting portions 225*h* with which the first communication hole 225*f* is continuous.

Figure 12:
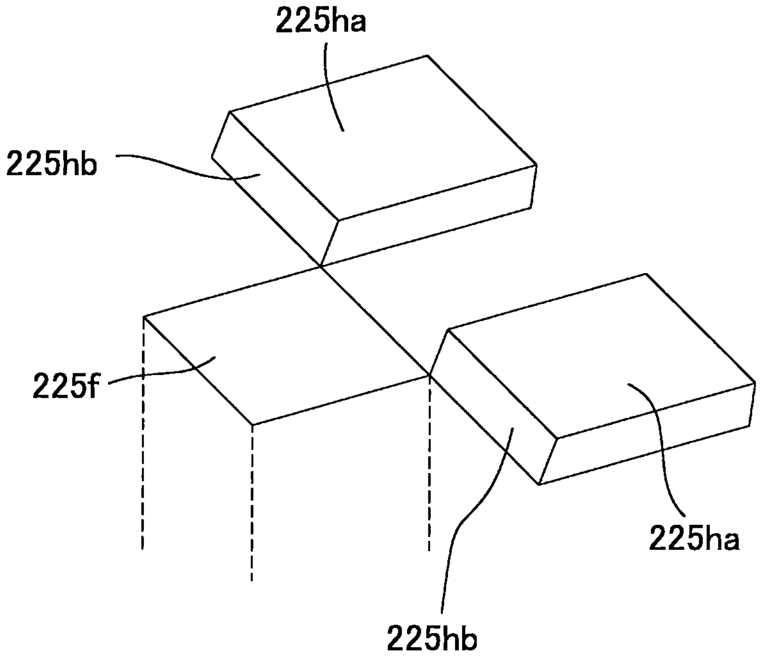
FIG. 12 is an enlarged view of a periphery of a first communication hole.

FIG. 12 is an enlarged view of a periphery of the first communication hole 225*f*. In FIG. 12, for ease of understanding, one of three projecting portions 225*h* continuous with the first communication hole 225*f* is not illustrated. The plurality of projecting portions 225*h* illustrated in FIG. 7 can hold ink. The plurality of projecting portions 225*h* is formed on the exposed surface 225*b*. In the present embodiment, the plurality of projecting portions 225*h* is positioned away from each other on the exposed surface 225*b*. As illustrated in FIG. 9, in the present embodiment, each of the plurality of projecting portions 225*h* is formed so as to be positioned on the +Z direction side with respect to the opening leading end portion 225*aa* of the accommodation opening portion 225*a*. In the present embodiment, the plurality of projecting portions 225*h* has a substantially rectangular parallelepiped shape. Note that all of the plurality of projecting portions 225*h* do not have the same shape. As illustrated in FIG. 7, the projecting portions 225*h* in contact with the accommodation opening portion 225*a* each have a shape along an outer periphery of the accommodation opening portion 225*a*. In addition, the projecting portions 225*h* in contact with the step ST2 between the exposed surface 225*b* and the discontinuous surface 225*j* each have a shape along the step ST2.

As illustrated in FIG. 7, in the present embodiment, three projecting portions 225*h*, which are some projecting portions 225*h* among the plurality of projecting portions 225*h*, are continuous with the first communication hole 225*f*. As illustrated in FIG. 12, the projecting portions 225*h* continuous with the first communication hole 225*f* are referred to as hole continuous projecting portions 225*ha*. In the present embodiment, a corner of each hole continuous projecting portion 225*ha* is continuous with a corner of the first communication hole 225*f*. As illustrated in FIG. 12, each hole continuous projecting portion 225*ha* includes an inclined surface 225*hb*. As illustrated in FIG. 10, the inclined surface 225*hb* is inclined with respect to the direction A from the exposed surface 225*b* toward the inner wall surface 225*c*. The projecting portions 225*h* continuous with the second communication hole 225*g* illustrated in FIG. 7 each have the same configuration as the hole continuous projecting portion 225*ha*.

The circuit board 23 illustrated in FIG. 4 is provided with a cartridge-side terminal 231 that comes into contact with the apparatus-side terminal portion 125 of the cartridge mounting portion 12 illustrated in FIG. 2. The circuit board 23 is provided at a corner portion where the accommodation front wall 221 and the accommodation bottom wall 225 illustrated in FIG. 4 intersect with each other. The corner portion is a recessed portion recessed toward the inside of the accommodation portion 220.

Figure 13:
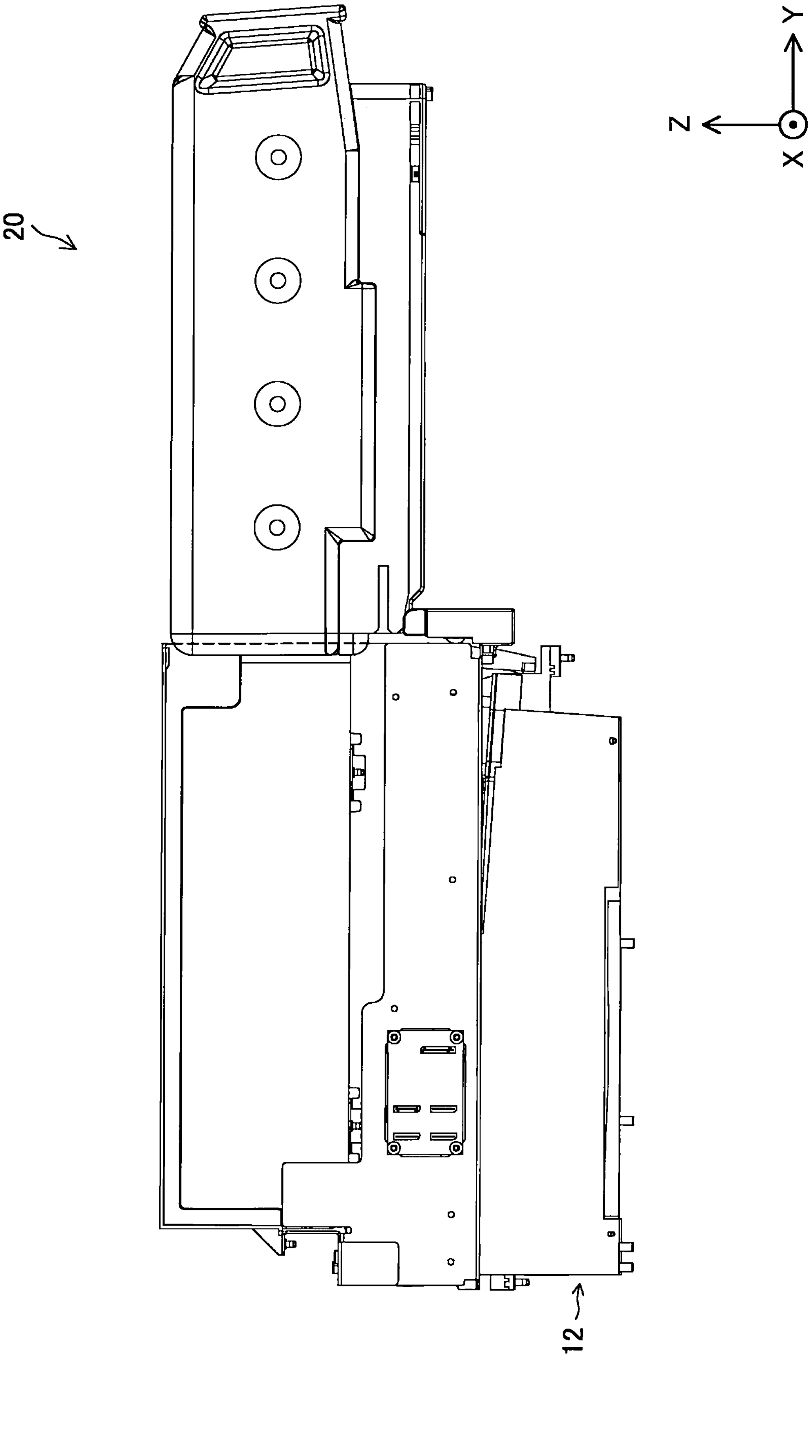
FIG. 13 is a view for explaining a mounting process in which the cartridge is being mounted in the cartridge mounting portion.
Figure 14:
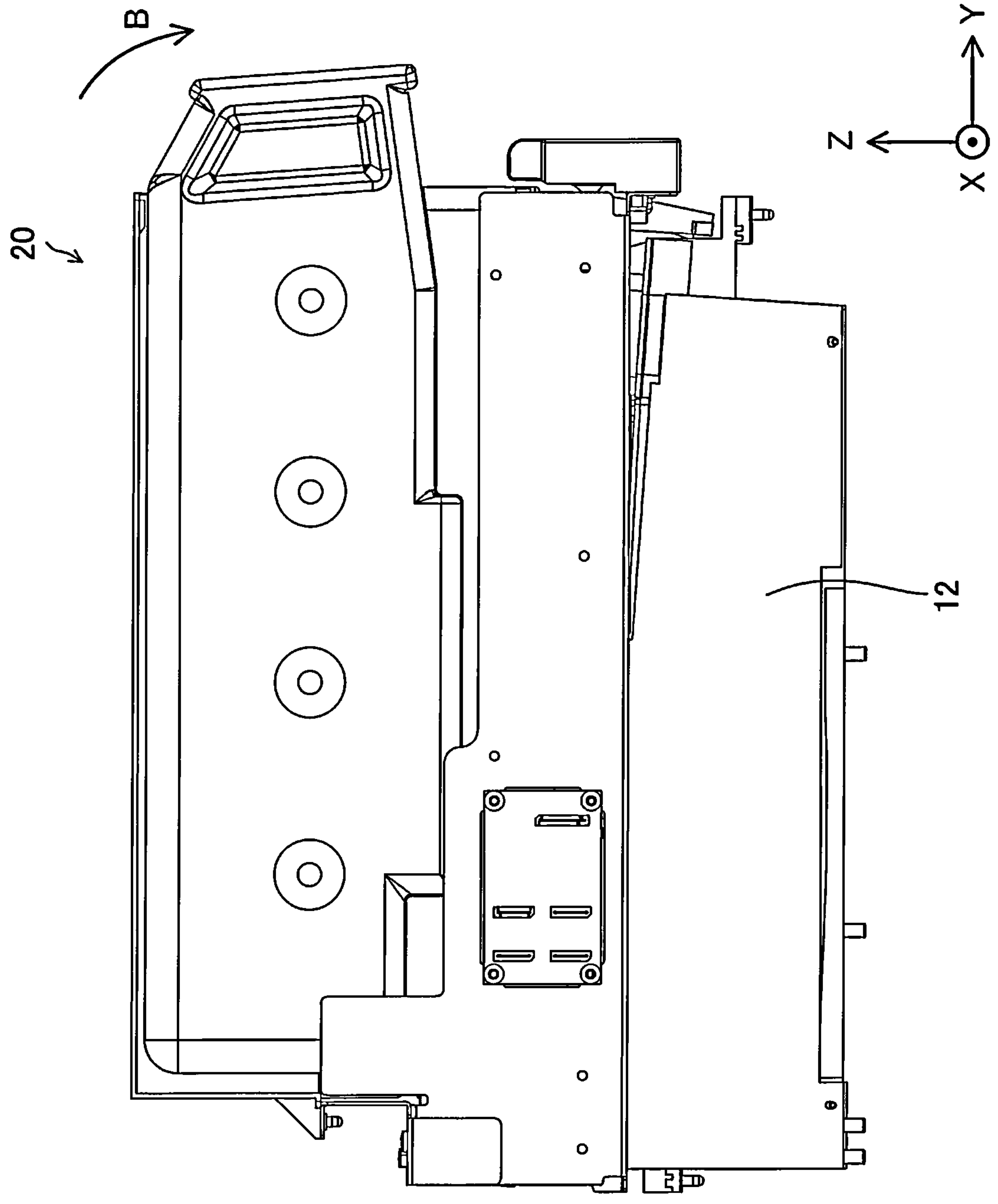
FIG. 14 is a view illustrating a state in which the cartridge is inserted into the cartridge mounting portion.
Figure 15:
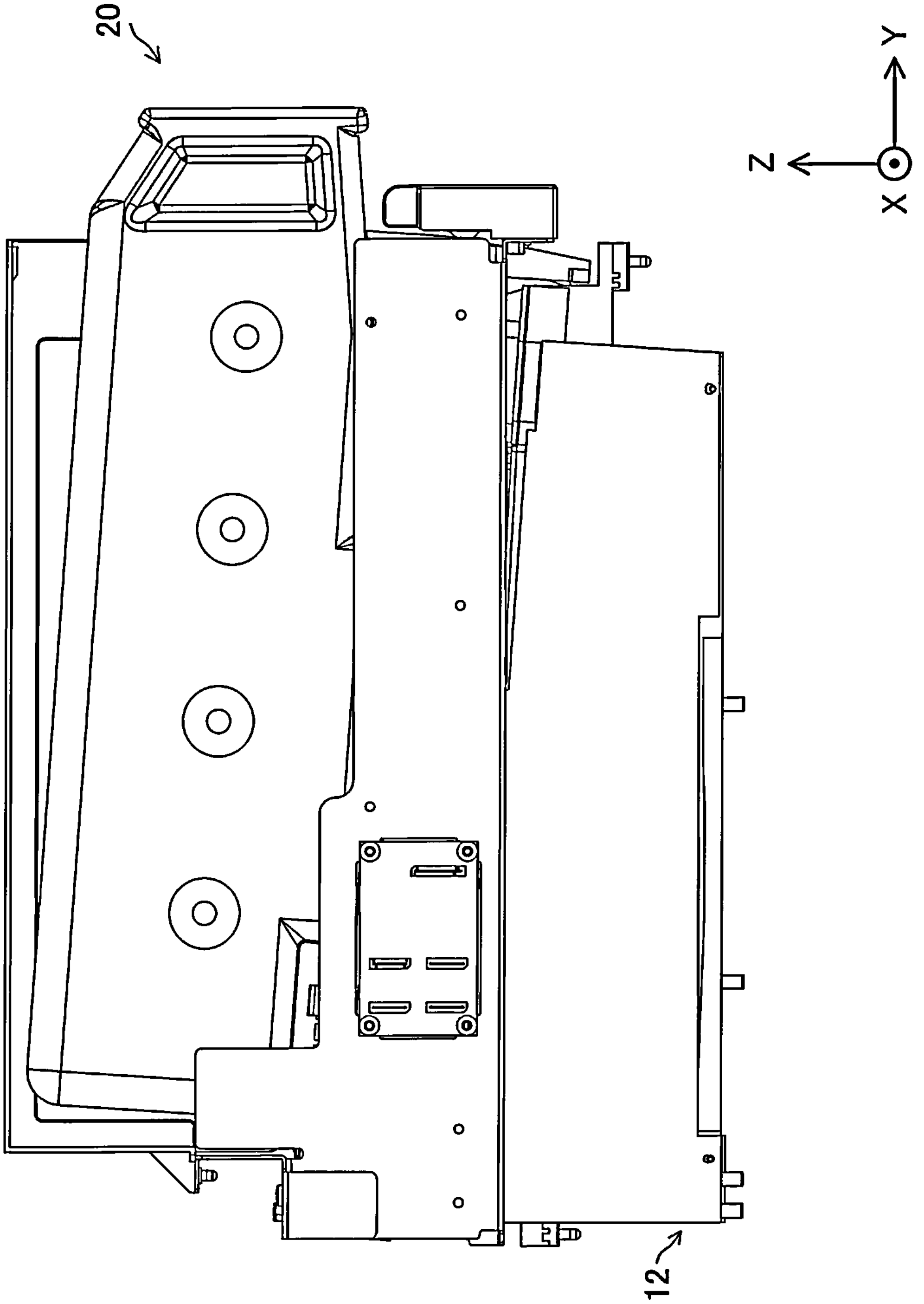
FIG. 15 is a view for explaining a mounted state in which mounting of the cartridge in the cartridge mounting portion is completed.

A2. Description of Mounting Process, Mounted State, and Removal of Cartridge 20:

FIG. 13 is a view for explaining a mounting process in which the cartridge 20 is being mounted in the cartridge mounting portion 12. FIG. 14 is a view illustrating a state in which the cartridge 20 is inserted into the cartridge mounting portion 12. FIG. 15 is a view for explaining a mounted state in which mounting of the cartridge 20 in the cartridge mounting portion 12 is completed. The mounting process includes a terminal connection process and a supply portion connection process. The terminal connection process is a process in which the cartridge 20 is moved in the −Y direction by the user from the state illustrated in FIG. 13 to the state illustrated in FIG. 14 and is inserted into the cartridge mounting portion 12, and thus the cartridge mounting portion 12 and the cartridge 20 are electrically connected to each other. The supply portion connection process is a process in which the liquid introduction portion 121 of the cartridge mounting portion 12 and the liquid supply portion 218 of the cartridge 20 are connected to each other in a state in which the cartridge mounting portion 12 and the cartridge 20 are electrically connected to each other. Specifically, in the supply portion connection process, the liquid introduction portion 121 and the liquid supply portion 218 are connected by the user rotationally moving the cartridge 20 in a direction indicated by an arrow B around a rotation fulcrum RF of the cartridge mounting portion 12 illustrated in FIG. 3 from the state illustrated in FIG. 14. As a result, as illustrated in FIG. 15, mounting of the cartridge 20 in the cartridge mounting portion 12 is completed. Removal of the cartridge 20 is performed by the user pushing up the cartridge 20 in a direction opposite to the direction of the arrow B and then pulling out the cartridge 20 in the +Y direction.

A3. Description of Adhesion of Ink to Exposed Surface 225*b* and Projecting Portions 225*h*:

When the cartridge 20 is removed, the liquid supply portion 218 is pushed up in a direction opposite to the direction of the arrow B in FIG. 14 in accordance with the pushing-up of the cartridge 20. When the liquid supply portion 218 is pushed up, the liquid introduction portion 121 of the printing apparatus 10 is pushed up, and ink may be scattered upward in the vertical direction from the liquid introduction portion 121. At this time, it is considered that there is a high possibility that the ink is scattered toward the exposed surface 225*b* continuous with the accommodation opening portion 225*a* compared to surfaces of the accommodation bottom wall 225 other than the exposed surface 225*b*.

In the present embodiment, as illustrated in FIG. 7, the plurality of projecting portions 225*h* is formed on the exposed surface 225*b*. When the ink scattered toward the exposed surface 225*b* adheres to the exposed surface 225*b*, the ink is sucked up to edges of the surrounding projecting portions 225*h* by capillary force to be held. In addition, when the cartridge 20 is moved by the user, the ink adhering to the exposed surface 225*b* flows into a recessed portion of the inner wall surface 225*c* through the first communication hole 225*f* or the second communication hole 225*g* along the exposed surface 225*b* on which the projecting portions 225*h* are not formed, and thus the ink is held.

In the present embodiment, in a case where the ink flows along the exposed surface 225*b*, there is a possibility that the ink adheres to the hole continuous projecting portion 225*ha* continuous with the first communication hole 225*f* illustrated in FIG. 12. At this time, due to the inclined surface 225*hb* of the hole continuous projecting portion 225*ha* inclined with respect to the direction A from the exposed surface 225*b* toward the inner wall surface 225*c*, the capillary force of an edge of the first communication hole 225*f* becomes larger than the capillary force of the inclined surface 225*hb* of the hole continuous projecting portion 225*ha*. Accordingly, the ink on the exposed surface 225*b* side efficiently flows into the first communication hole 225*f* and moves to the inner wall surface 225*c*. The same applies to the second communication hole 225*g* and the projecting portions 225*h* continuous with the second communication hole 225*g*.

In the present embodiment, when the cartridge 20 is removed from the printing apparatus 10, even in a case where a liquid is scattered from the liquid introduction portion 121 to the periphery of the accommodation opening portion 225*a*, the liquid adheres to edges of the plurality of projecting portions 225*h*, and thus the cartridge 20 can hold the liquid. In comparison with the cartridge 20 in which, for example, a porous body or a non-woven fabric is used as a liquid absorbing member to which the liquid adheres, the liquid can be removed through cleaning of the cartridge 20 when the cartridge 20 is reused, and therefore, the cartridge 20 does not have to be disassembled.

In the present embodiment, the exposed surface 225*b* is formed at a position closer to the second supply portion end portion 218*b* than is a portion of the accommodation opening portion 225*a* farthest from the second supply portion end portion 218*b*, which is the other end portion of the liquid supply portion 218. In comparison with an aspect in which the exposed surface 225*b* is formed at the same position as or a position far from the second supply portion end portion 218*b* compared to the portion farthest from the second supply portion end portion 218*b*, it is possible to prevent the liquid adhering to the projecting portions 225*h* or the exposed surface 225*b* from moving and flowing into the accommodation opening portion 225*a* when the cartridge 20 is moved by the operator.

Moreover, in the present embodiment, each of the plurality of projecting portions 225*h* is formed so as to be positioned on the +Z direction side with respect to the opening leading end portion 225*aa* of the accommodation opening portion 225*a*. For example, in a case where the accommodation portion 220 is placed on a workbench so as to be on a lower side in the vertical direction with respect to the liquid containing body 210, it is possible to prevent ink from adhering to the workbench.

In the present embodiment, when a liquid adhering to the projecting portions 225*h* or the exposed surface 225*b* moves to the inner wall surface 225*c* side through the first communication hole 225*f* or the second communication hole 225*g* and flows into the first recessed portion 225*d* or the second recessed portion 225*e*, the ink is likely to spread on the inner wall surface 225*c* along the first recessed portion 225*d* or the second recessed portion 225*e* extending along the inner wall surface 225*c*. The amount of ink held by the accommodation bottom wall 225 can be increased compared to an aspect in which the first communication hole 225*f* and the second communication hole 225*g* are not provided, and the first recessed portion 225*d* and the second recessed portion 225*e* are not formed in the inner wall surface 225*c*.

In the present embodiment, the end portion hole 218*bc* and the first recessed portion 225*d* overlap with each other, and the end portion hole 218*bc* and the second recessed portion 225*e* overlap each other. For example, in a case where a liquid adhering to the end portion opening portion 218*ba* flows into the end portion hole 218*bc*, the liquid flowing into the end portion hole 218*bc* flows into the first recessed portion 225*d* or the second recessed portion 225*e*, and thus the first recessed portion 225*d* or the second recessed portion 225*e* can hold the ink. Therefore, it is possible to suppress leaking of ink to the outside of the cartridge 20 from the end portion opening 218*c* formed by the end portion opening portion 218*ba* of the liquid supply portion 218.

In the present embodiment, compared to an aspect in which the inclined surface 225*hb* is not formed in the hole continuous projecting portion 225*ha*, in a case where ink adheres to the hole continuous projecting portion 225*ha*, the ink flows on the inclined surface 225*hb* and easily flows into the first communication hole 225*f* or the second communication hole 225*g*. As a result, it is possible to increase the amount of ink held by the accommodation bottom wall 225, compared to an aspect in which the inclined surface 225*hb* is not formed in the hole continuous projecting portion 225*ha*.

B. Second Embodiment

Figure 16:
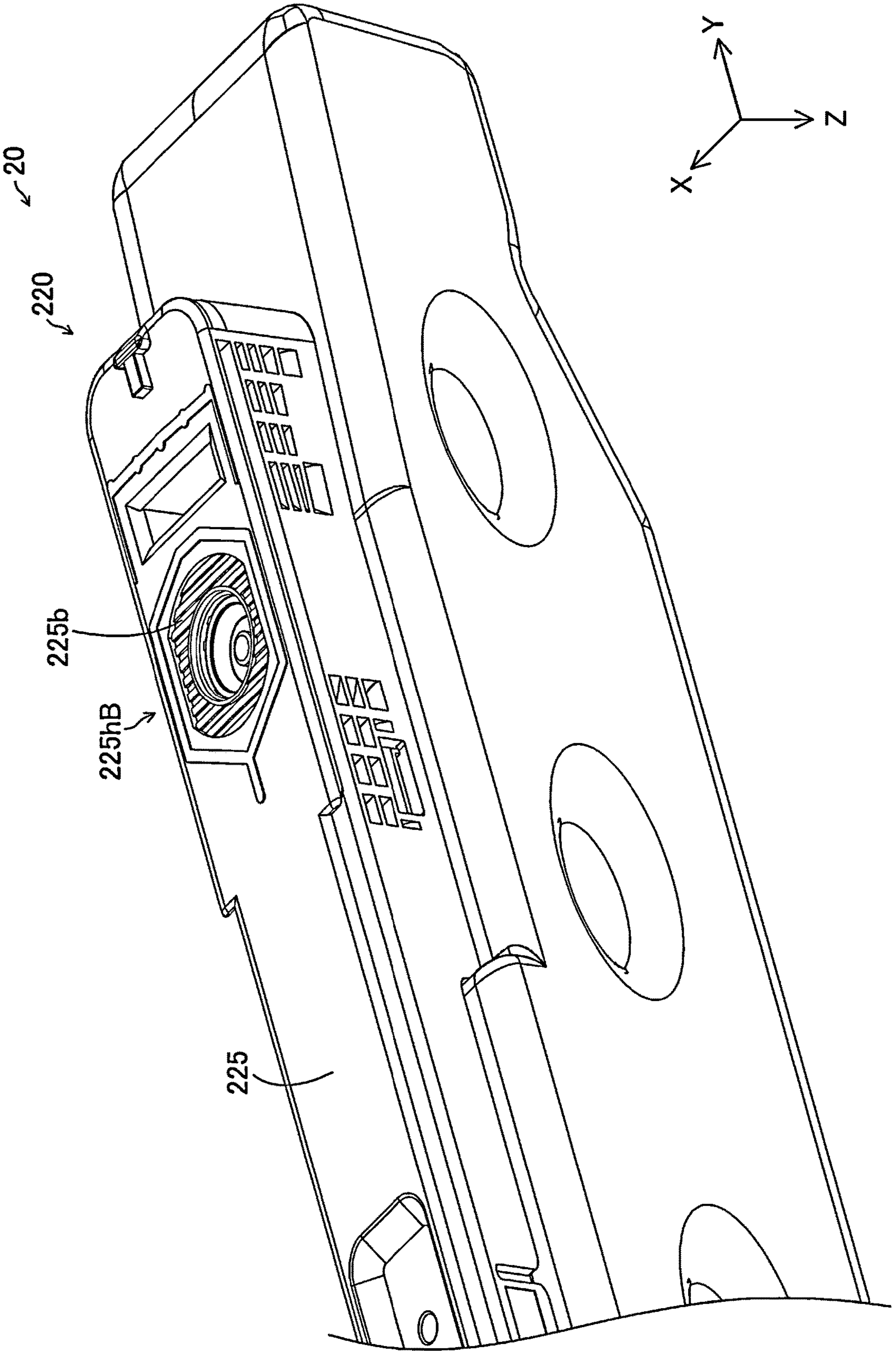
FIG. 16 is a view for explaining a cartridge according to a second embodiment.

FIG. 16 is a view for explaining the cartridge 20 according to a second embodiment. The second embodiment is different from the first embodiment in shape of a projecting portion formed on the exposed surface 225*b* and in that the accommodation bottom wall 225 does not include the first communication hole 225*f*, the second communication hole 225*g*, the first recessed portion 225*d*, and the second recessed portion 225*e*. Since other configurations are the same as those of the first embodiment, detailed description thereof will be omitted, and the same reference numerals will be given.

In the second embodiment, the accommodation bottom wall 225 of the accommodation portion 220 has linear projecting portions 225*h*B that is a plurality of linear projecting portions. As illustrated in FIG. 16, a plurality of the linear projecting portions 225*h*B is formed on the exposed surface 225*b* at intervals in the Y direction. The plurality of linear projecting portions 225*h*B is arranged in the X direction, which is a predetermined direction, on the exposed surface 225*b*. Each of the plurality of linear projecting portions 225*h*B extends in the X direction.

In the second embodiment, the same effects as those of the first embodiment are obtained. That is, even in a case where ink is scattered from the liquid introduction portion 121 when the cartridge 20 is removed from the printing apparatus 10, the ink adheres to edges of the linear projecting portions 225_h_B, and thus the cartridge 20 can hold the ink. In comparison with the cartridge 20 in which, for example, a porous body or a non-woven fabric is used as a liquid absorbing member to which the ink adheres, the ink can be removed through cleaning of the cartridge 20 when the cartridge 20 is reused, and thus the cartridge 20 does not have to be disassembled.

C. Third Embodiment

Figure 17:
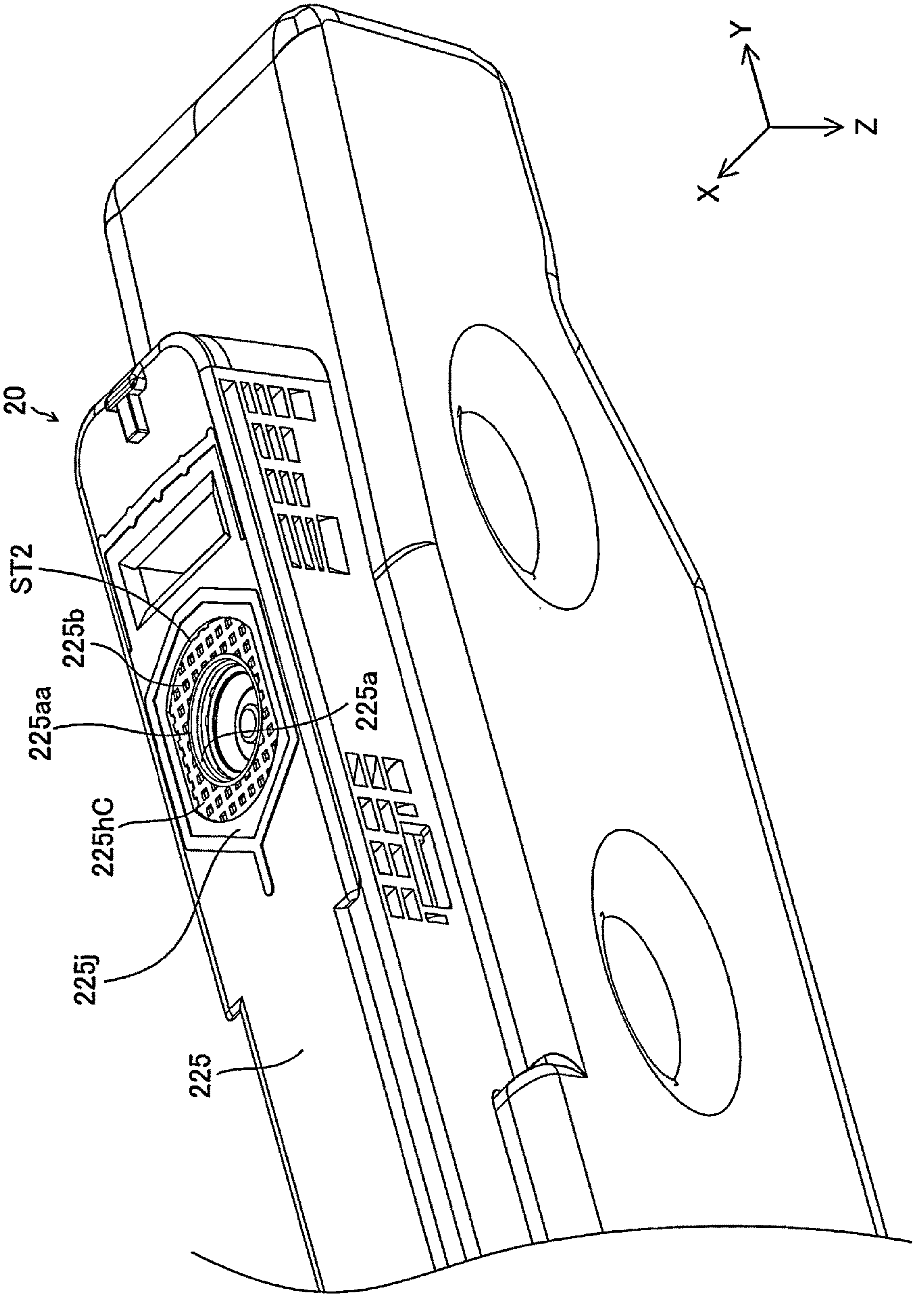
FIG. 17 is a view for explaining a cartridge according to a third embodiment.

FIG. 17 is a view for explaining the cartridge 20 according to a third embodiment. The third embodiment is different from the second embodiment in shape of a projecting portion formed on the exposed surface 225_b_. Since other configurations are the same as those of the second embodiment, detailed description thereof will be omitted, and the same reference numerals will be given.

In the third embodiment, the accommodation bottom wall 225 includes a continuous projecting portion 225_h_C, which is one projecting portion. The continuous projecting portion 225_h_C is a projecting portion formed in a mesh shape on the exposed surface 225_b_. A part of the exposed surface 225_b_ is exposed to the outside by the mesh of the continuous projecting portion 225_h_C. The continuous projecting portion 225_h_C is formed so that a surface on the most −Z direction side among the surfaces of the continuous projecting portion 225_h_C is positioned further on the +Z direction side than is the opening leading end portion 225_aa_ of the accommodation opening portion 225_a_. The continuous projecting portion 225_h_C has a shape along the accommodation opening portion 225_a_ in a portion in contact with the outer periphery of the accommodation opening portion 225_a_. The continuous projecting portion 225_h_C has a shape along the step ST2 in a portion in contact with the step ST2 between the exposed surface 225_b_ and the discontinuous surface 225_j_.

In the third embodiment, the same effects as those of the first embodiment are obtained. That is, even in a case where ink is scattered from the liquid introduction portion 121 when the cartridge 20 is removed from the printing apparatus 10, the ink adheres to an edge of the mesh of the continuous projecting portion 225_h_C, and thus the cartridge 20 can hold the ink. In comparison with the cartridge 20 in which, for example, a porous body or a non-woven fabric is used as a liquid absorbing member to which the ink adheres, the ink can be removed through cleaning of the cartridge 20 when the cartridge 20 is reused, and thus the cartridge 20 does not have to be disassembled.

D. Fourth Embodiment

Figure 18:
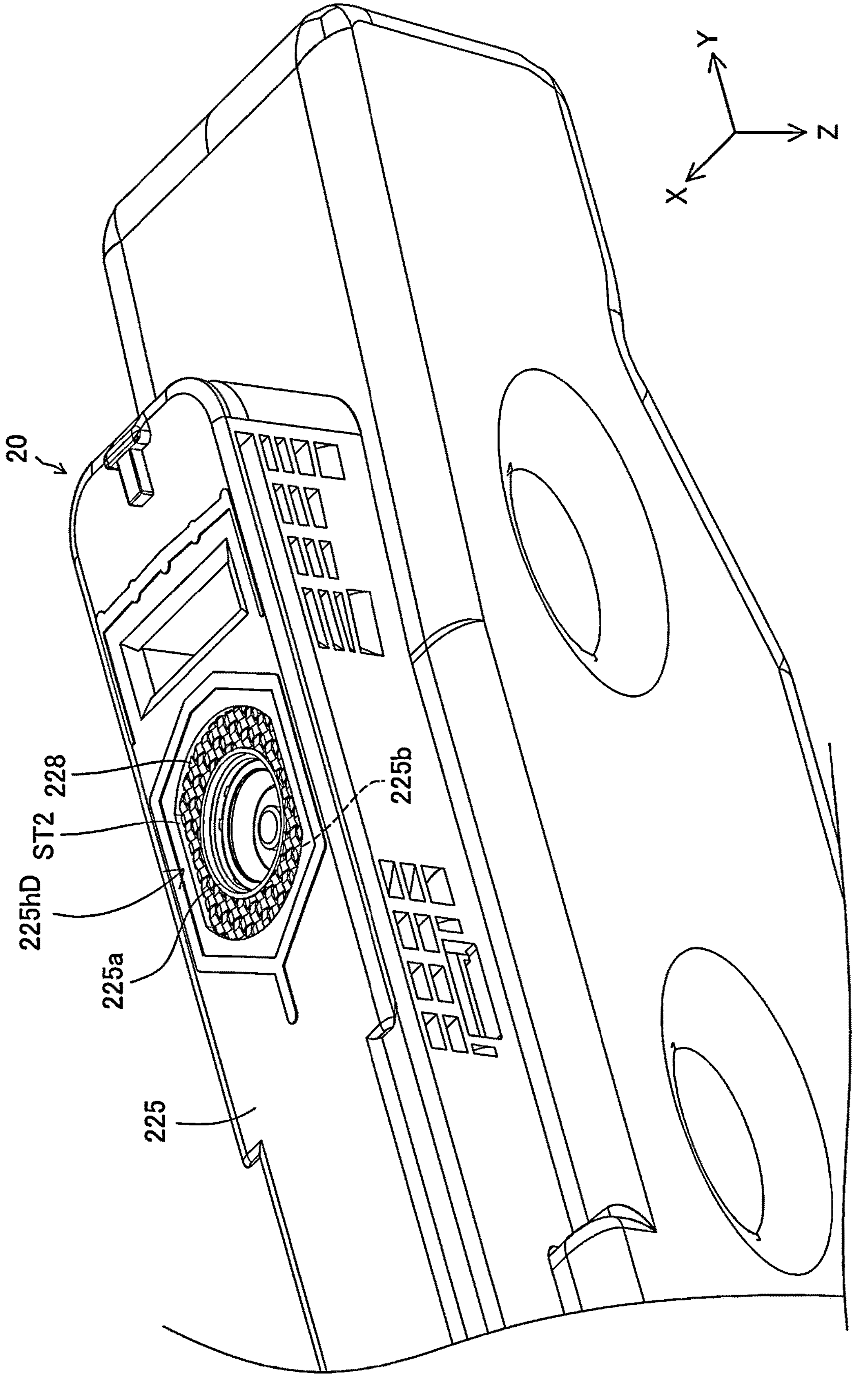
FIG. 18 is a view for explaining a cartridge according to a fourth embodiment.

FIG. 18 is a view for explaining the cartridge 20 according to a fourth embodiment. The fourth embodiment is different from the second embodiment in shape of a projecting portion formed on the exposed surface 225_b_. Since other configurations are the same as those of the second embodiment, detailed description thereof will be omitted, and the same reference numerals will be given. In the fourth embodiment, the accommodation bottom wall 225 includes a mountain-shaped projecting portion 225_h_D and a non-mountain-shaped projecting portion 228.

Figure 19:
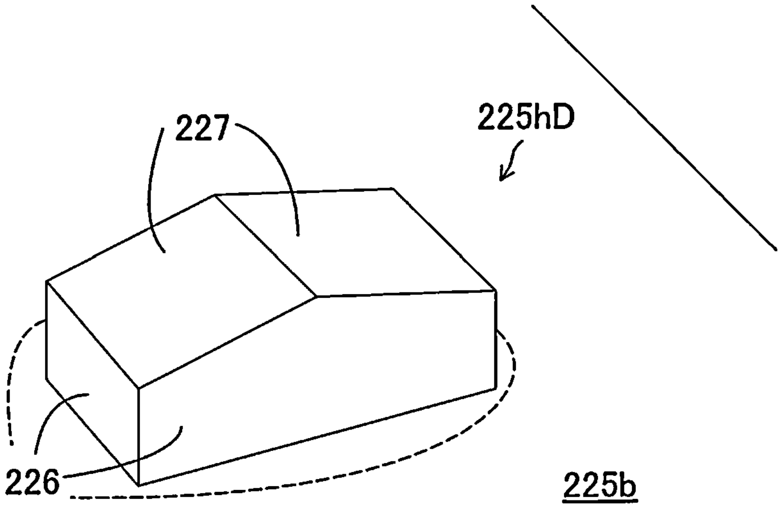
FIG. 19 is a view illustrating one mountain-shaped projecting portion.

FIG. 19 is a view illustrating one mountain-shaped projecting portion 225_h_D. For ease of understanding, the exposed surface 225_b_ is illustrated in FIG. 19. As illustrated in FIG. 18, in the fourth embodiment, the accommodation bottom wall 225 includes a plurality of the mountain-shaped projecting portions 225_h_D, which is a plurality of projecting portions. The plurality of mountain-shaped projecting portions 225_h_D is formed on the exposed surface 225_b_. As illustrated in FIG. 19, each of the plurality of mountain-shaped projecting portions 225_h_D is formed by a plurality of surfaces. The plurality of surfaces includes four connection surfaces 226 and two non-connection surfaces 227. The connection surfaces 226 are surfaces connected to the exposed surface 225_b_. The two non-connection surfaces 227 are surfaces connected to a part of the four connection surfaces 226. The two non-connection surfaces 227 are inclined with respect to the exposed surface 225_b_ and are connected to each other at one side.

The non-mountain-shaped projecting portion 228 can hold ink. As illustrated in FIG. 18, in the present embodiment, a plurality of the non-mountain-shaped projecting portions 228 in contact with the outer periphery of the accommodation opening portion 225_a_ and the step ST2 between the exposed surface 225_b_ and the discontinuous surface 225_j_ is formed. Each non-mountain-shaped projecting portion 228 is formed of a plurality of surfaces connected to the exposed surface 225_b_ and one or more surfaces connected to a surface connected to the exposed surface 225_b_. The one or more surfaces connected to the surface connected to the exposed surface 225_b_ are inclined with respect to the exposed surface 225_b_. The plurality of non-mountain-shaped projecting portions 228 has a shape along the outer periphery of the accommodation opening portion 225_a_ and the step ST2.

In the fourth embodiment, the same effects as those of the first embodiment are obtained. That is, when the cartridge 20 is removed from the printing apparatus 10, even in a case where ink is scattered from the liquid introduction portion 121, the ink adheres to edges of the mountain-shaped projecting portions 225_h_D, and thus the cartridge 20 can hold the ink. In comparison with the cartridge 20 in which, for example, a porous body or a non-woven fabric is used as a liquid absorbing member to which the ink adheres, the ink can be removed through cleaning of the cartridge 20 when the cartridge 20 is reused, and thus the cartridge 20 does not have to be disassembled.

E. Other Embodiments

E1. Other Embodiment 1

1. In the above-described first embodiment, the plurality of projecting portions 225_h_ is formed on the accommodation bottom wall 225. For example, one projecting portion may be formed on the accommodation bottom wall.

2. In the above-described embodiments, the liquid containing body 210 and the accommodation portion 220 are formed by injection molding using polypropylene as a material. Note that each of the liquid containing body and the accommodation portion may be formed of a synthetic resin other than polypropylene. The accommodation portion is formed of a material other than a porous body and a non-woven fabric.

3. In the above-described embodiments, the liquid containing body 210 and the accommodation portion 220 are separately formed by injection molding. For example, the liquid containing body and the accommodation portion may be integrally formed by injection molding so that the liquid containing body and the accommodation portion are connected to each other.

4. In the above-described embodiments, the second supply portion end portion 218*b*, which is another end portion of the liquid supply portion 218, is in contact with the inner wall surface 225*c* of the accommodation bottom wall 225 of the accommodation portion 220 and the accommodation opening portion 225*a* continuous with the inner wall surface 225*c*. Note that the second supply portion end portion of the liquid supply portion does not have to be in contact with the inner wall surface and the accommodation opening portion. The accommodation opening portion and the inner wall surface may face the other end portion of the liquid supply portion with a gap formed therebetween. In an aspect in which the accommodation opening portion and the inner wall surface face the other end portion of the liquid supply portion with a gap formed therebetween, and an end portion hole and a recessed portion overlap with each other, for example, in a case where a liquid adhering to the end portion opening portion flows into the end portion hole, the liquid flowing into the end portion hole flows into the recessed portion, and thus the recessed portion can hold the liquid. Therefore, it is possible to suppress leaking of the ink to the outside of the cartridge from the end portion opening formed by the end portion opening portion of the liquid supply portion.

E2. Other Embodiment 2

In the above-described embodiments, the exposed surface 225*b* is formed at a position closer to the second supply portion end portion 218*b* than is a portion of the accommodation opening portion 225*a* farthest from the second supply portion end portion 218*b*. For example, when viewed in the X direction or the Y direction, the exposed surface may be formed so as to be at the same position in the Z direction as the portion of the accommodation opening portion farthest from the second supply portion end portion.

E3. Other Embodiment 3

1. In the above-described first embodiment, the first communication hole 225*f*, the second communication hole 225*g*, the first recessed portion 225*d*, and the second recessed portion 225*e* are formed in the accommodation bottom wall 225. For example, the accommodation bottom wall may include one communication hole and one recessed portion continuous with the communication hole. For example, the accommodation bottom wall does not have to include the communication hole and the recessed portion.

2. For example, the accommodation bottom wall 225 may include, in addition to the first communication hole 225*f* and the second communication hole 225*g*, a communication hole that is formed at a different position in the exposed surface 225*b* from the first communication hole 225*f* and the second communication hole 225*g*. For example, the accommodation bottom wall may include a third communication hole positioned on the +Y direction side of the first communication hole and a fourth communication hole positioned on the +Y direction side of the second communication hole, the first communication hole and the third communication hole may be continuous with the first recessed portion, and the second communication hole and the fourth communication hole may be continuous with the second recessed portion.

3. In an aspect in which the plurality of communication holes is formed in the accommodation bottom wall, a plurality of recessed portions corresponding to the communication holes, respectively, and continuous with the communication holes, respectively, may be formed in the accommodation bottom wall.

4. In the above-described embodiments, the first recessed portion 225*d* and the second recessed portion 225*e* extend along the inner wall surface 225*c*. For example, in an aspect in which the recessed portion has a circular shape, the recessed portion does not have to have a shape extending along the inner wall surface.

E4. Other Embodiment 4

1. In the above-described first embodiment, the liquid supply portion 218 includes the end portion groove 218*bb* formed continuously with the end portion opening portion 218*ba*, and the end portion hole 218*bc*. For example, in an aspect in which the accommodation bottom wall does not include the recessed portion, the liquid supply portion does not have to include the end portion groove and the end portion hole.

2. In above-described first embodiment, the end portion hole 218*bc* and the first recessed portion 225*d* or the second recessed portion 225*e* overlap with each other. For example, a part of the end portion hole and a part of the recessed portion may overlap with each other. In addition, in an aspect in which the liquid supply portion includes the end portion hole, and the accommodation bottom wall includes the recessed portion, the end portion hole and the recessed portion does not have to overlap with each other.

3. In the above-described first embodiment, the end portion second hole 218*be* that does not overlap with the first recessed portion 225*d* or the second recessed portion 225*e* is formed in the liquid supply portion 218. For example, in an aspect in which the recessed portion is formed in a wide range in the inner wall surface compared to the first embodiment, at least a part of each of all the holes formed in the groove formed in the liquid supply portion and at least a part of the recessed portion may overlap with each other.

E5. Other Embodiment 5

1. In the above-described first embodiment, among the plurality of projecting portions 225*h*, the hole continuous projecting portion 225*ha* continuous with the first communication hole 225*f* includes the inclined surface 225*hb* inclined with respect to the direction A from the exposed surface 225*b* toward the inner wall surface 225*c*. For example, in an aspect in which the accommodation bottom wall does not include the communication hole, the projecting portion including the inclined surface does not have to be formed on the accommodation bottom wall.

2. In the above-described first embodiment, a corner of the hole continuous projecting portion 225*ha* is continuous with a corner of the first communication hole 225*f*. For example, the hole continuous projecting portion may be continuous with the communication hole such that a side of the hole continuous projecting portion coincides with a side of the communication hole. For example, the hole continuous projecting portion may be continuous with the communication hole such that a part of a side of the hole continuous projecting portion coincides with a part of a side of the communication hole. In this aspect as well, capillary force of an edge of the communication hole is larger than capillary force of the inclined surface of the hole continuous projecting portion. As a result, ink on the exposed surface side efficiently flows into the first communication hole and moves to the inner wall surface.

E6. Other Embodiment 6

In the above-described first embodiment, the exposed surface 225*b* is provided with the plurality of projecting portions 225*h* positioned away from each other. For example, corners of some of the plurality of projecting portions may be in contact with each other.

E7. Other Embodiment 7

1. In the above-described second embodiment, each of the plurality of linear projecting portions 225*h*B is arranged in the X direction, which is the predetermined direction A. For example, each of the plurality of linear projecting portions may be arranged in the Y direction.

2. In the above-described second embodiment, the accommodation bottom wall 225 does not include the communication hole or the recessed portion. For example, one or more communication holes through which the exposed surface and the inner wall surface are in communication with each other may be formed between two of the plurality of linear projecting portions, and one or more recessed portions continuous with the communication holes and recessed toward the exposed surface may be formed in the inner wall surface. In this aspect, when ink adhering to the projecting portions or the exposed surface moves to the inner wall surface side through the communication holes and flows into the recessed portions, the ink is likely to spread on the inner wall surface along the recessed portions extending along the inner wall surface. The amount of a liquid held by the bottom wall can be increased compared to an aspect in which the communication holes are not provided and the recessed portions are not formed in the inner wall surface.

3. In this aspect, the linear projecting portions continuous with the communication holes may include an inclined surface inclined with respect to a direction from the exposed surface toward the inner wall surface.

E8. Other Embodiment 8

In the above-described third embodiment, the accommodation bottom wall 225 does not include the communication hole and the recessed portion. For example, a communication hole may be formed in a portion of the exposed surface exposed by the mesh of the continuous projecting portion, and a recessed portion continuous with the communication hole may be formed in the inner wall surface. In this aspect, when ink adhering to the projecting portions or the exposed surface moves to the inner wall surface side through the communication hole and flows into the recessed portion, the ink is likely to spread on the inner wall surface along the recessed portion extending along the inner wall surface. The amount of a liquid held by the bottom wall can be increased compared to an aspect in which the communication holes are not provided and the recessed portions are not formed in the inner wall surface. In addition, in this aspect, the continuous projecting portion continuous with the communication hole may include an inclined surface inclined with respect to the direction from the exposed surface toward the inner wall surface.

E9. Other Embodiment 9

1. In the above-described fourth embodiment, the accommodation bottom wall 225 does not include the communication hole and the recessed portion. For example, a communication hole through which the exposed surface and the inner wall surface are in communication with each other may be formed between some of the projecting portions adjacent to each other among the plurality of projecting portions of the accommodation bottom wall. In this aspect, when ink adhering to the projecting portions or the exposed surface moves to the inner wall surface side through the communication hole and flows into the recessed portion, the ink is likely to spread on the inner wall surface along the recessed portion extending along the inner wall surface. The amount of a liquid held by the bottom wall can be increased compared to an aspect in which the communication holes are not provided and the recessed portions are not formed in the inner wall surface.

2. The adjacent mountain-shaped projecting portions may be away from each other or may be in contact with each other.

F. Other Aspects

The present disclosure is not limited to the above-described embodiments, and can be implemented in various forms without departing from the scope of the present disclosure. For example, the present disclosure can also be realized by the following aspects. The technical features in the above-described embodiments corresponding to the technical features in each aspect described below can be appropriately replaced or combined in order to solve a part or all of the problems of the present disclosure or in order to achieve a part or all of the effects of the present disclosure. In addition, if the technical features are not described as essential in this specification, the technical features can be appropriately deleted.

1. According to an aspect of the present disclosure, there is provided a cartridge to be mounted in a printing apparatus including a liquid introduction portion. The cartridge includes a liquid containing body that contains a liquid, and an accommodation portion connected to the liquid containing body, and the liquid containing body includes a liquid containing portion that is formed inside the liquid containing body and that contains a liquid, and a liquid supply portion capable of supplying the liquid contained in the liquid containing portion to the printing apparatus by being connected to the liquid introduction portion, the liquid supply portion being a tubular member of which one end portion is in contact with the liquid containing portion, the accommodation portion accommodates a part of the liquid supply portion therein, and has a bottom wall that is a wall portion facing the printing apparatus when the cartridge is mounted in the printing apparatus, and the bottom wall includes an opening portion that faces another end portion of the liquid supply portion with a gap formed therebetween or that is in contact with the other end portion, the opening portion forming an opening into which the liquid introduction portion is inserted, an exposed surface continuous with the opening portion and exposed to an outside, and one or more projecting portions formed on the exposed surface.

According to the cartridge of this aspect, even in a case where the liquid is scattered from the liquid introduction portion to the periphery of the opening portion when the cartridge is removed from the printing apparatus, the liquid adheres to an edge of the projecting portion, and thus the cartridge can hold the liquid. In comparison with a cartridge in which, for example, a porous body or a non-woven fabric is used as a liquid absorbing member to which the liquid adheres, the liquid can be removed through cleaning of the cartridge when the cartridge is reused, and thus the cartridge does not have to be disassembled.

2. In the cartridge of the above-described aspect, the exposed surface may be formed at a position closer to the other end portion of the liquid supply portion than is a portion of the opening portion farthest from the other end portion of the liquid supply portion.

According to the cartridge of this aspect, in comparison with an aspect in which the exposed surface is formed at the same position or a position far from the other end portion of the liquid supply portion compared to a portion of the opening portion farthest from the other end portion of the liquid supply portion, it is possible to prevent a liquid adhering to the projecting portion or the exposed surface from moving and flowing into the opening portion in a case where the cartridge is moved by the operator.

3. In the cartridge of the above-described aspect, the bottom wall may further include a communication hole through which an inner wall surface that is a surface on a side opposite to the exposed surface side and the exposed surface are in communication with each other, and a recessed portion continuous with the communication hole in the inner wall surface, recessed toward the exposed surface, and extending along the inner wall surface.

According to the cartridge of this aspect, when a liquid adhering to the projecting portion or the exposed surface moves to the inner wall surface side through the communication hole and flows into the recessed portion, the liquid easily spreads on the inner wall surface along the recessed portion extending along the inner wall surface. The amount of a liquid held by the bottom wall can be increased compared to an aspect in which the communication hole is not provided and the recessed portion is not formed in the inner wall surface.

4. In the cartridge of the above-described aspect, the other end portion of the liquid supply portion may be in contact with the inner wall surface, and include an end portion opening portion forming an opening for guiding the liquid in the liquid containing portion to an outside, and a hole formed in a groove formed continuously with the end portion opening portion, and at least a part of the hole and at least a part of the recessed portion may overlap with each other when projected in a direction from the exposed surface toward the inner wall surface.

According to the cartridge of this aspect, for example, in a case where a liquid adhering to the end portion opening portion flows into the hole, the liquid flowing into the hole flows into the recessed portion, and thus the recessed portion can hold the liquid. Therefore, it is possible to suppress leaking of the liquid to the outside from the opening formed by the end portion opening portion.

5. In the cartridge of the above-described aspect, the bottom wall may further include a communication hole through which an inner wall surface that is a surface on a side opposite to the exposed surface side and the exposed surface are in communication with each other, and a recessed portion continuous with the communication hole in the inner wall surface, recessed toward the exposed surface, and extending along the inner wall surface, and some of the one or more projecting portions may be continuous with the communication hole and include an inclined surface inclined with respect to a direction from the exposed surface toward the inner wall surface.

According to the cartridge of this aspect, compared to an aspect in which the inclined surface is not formed, in a case where a liquid adheres to the projecting portion, the liquid easily flows into the communication hole by flowing on the inclined surface.

6. In the cartridge of the above-described aspect, the one or more projecting portions may be a plurality of projecting portions positioned away from each other on the exposed surface.

7. In the cartridge of the above-described aspect, the one or more projecting portions may be a plurality of linear projecting portions arranged at intervals in a predetermined direction on the exposed surface.

8. In the cartridge of the above-described aspect, the one or more projecting portions may be one projecting portion formed in a mesh shape on the exposed surface.

9. In the cartridge of the above-described aspect, the one or more projecting portions may be a plurality of projecting portions, each of the plurality of projecting portions may be formed by a plurality of surfaces, the plurality of surfaces may include four connection surfaces connected to the exposed surface and two non-connection surfaces that are not connected to the exposed surface and that are connected to a part of the four connection surfaces, and the two non-connection surfaces may be inclined with respect to the exposed surface and connected to each other at one side.

The present disclosure can be realized in various forms other than a cartridge. For example, the present disclosure can be realized in the form of a method of manufacturing a cartridge, a printing apparatus in which a cartridge is mounted, a printing system including a cartridge and a printing apparatus, and the like.

What is claimed is:

1. A cartridge to be mounted in a printing apparatus including a liquid introduction portion, the cartridge comprising:
- a liquid containing body that contains a liquid; and
- an accommodation portion connected to the liquid containing body, wherein
- the liquid containing body includes
  - a liquid containing portion that is formed inside the liquid containing body and that contains a liquid, and
  - a liquid supply portion capable of supplying the liquid contained in the liquid containing portion to the printing apparatus by being connected to the liquid introduction portion, the liquid supply portion being a tubular member of which one end portion is in contact with the liquid containing portion,
- the accommodation portion
  - accommodates a part of the liquid supply portion therein, and
  - has a bottom wall that is a wall portion facing the printing apparatus when the cartridge is mounted in the printing apparatus,
- the bottom wall includes
  - an opening portion that faces another end portion of the liquid supply portion with a gap formed therebetween or that is in contact with the other end portion, the opening portion forming an opening into which the liquid introduction portion is inserted,
  - an exposed surface continuous with the opening portion and exposed to an outside, and
  - one or more projecting portions formed on the exposed surface,
- the bottom wall further includes a communication hole through which an inner wall surface that is a surface on a side opposite to the exposed surface side and the exposed surface are in communication with each other, a recessed portion continuous with the communication hole in the inner wall surface, recessed toward the exposed surface, and extending along the inner wall surface, the other end portion of the liquid supply portion is in contact with the inner wall surface, and includes an end portion opening portion forming an opening for guiding the liquid in the liquid containing portion to an outside, and a hole formed in a groove formed continuously with the end portion opening portion, and at least a part of the hole and at least a part of the recessed portion overlap with each other when projected in a direction from the exposed surface toward the inner wall surface.

2. The cartridge according to claim 1, wherein the exposed surface is formed at a position closer to the other end portion of the liquid supply portion than is a portion of the opening portion farthest from the other end portion of the liquid supply portion.

3. The cartridge according to claim 1, wherein the bottom wall further includes a communication hole through which an inner wall surface that is a surface on a side opposite to the exposed surface side and the exposed surface are in communication with each other, and a recessed portion continuous with the communication hole in the inner wall surface, recessed toward the exposed surface, and extending along the inner wall surface, and some of the one or more projecting portions are continuous with the communication hole and include an inclined surface inclined with respect to a direction from the exposed surface toward the inner wall surface.

4. The cartridge according to claim 1, wherein the one or more projecting portions are a plurality of projecting portions positioned away from each other on the exposed surface.

5. The cartridge according to claim 1, wherein the one or more projecting portions are a plurality of linear projecting portions arranged at intervals in a predetermined direction on the exposed surface.

6. The cartridge according to claim 1, wherein the one or more projecting portions are one projecting portion formed in a mesh shape on the exposed surface.

7. The cartridge according to claim 1, wherein the one or more projecting portions are a plurality of projecting portions, each of the plurality of projecting portions is formed by a plurality of surfaces, the plurality of surfaces includes four connection surfaces connected to the exposed surface and two non-connection surfaces that are not connected to the exposed surface and that are connected to a part of the four connection surfaces, and the two non-connection surfaces are inclined with respect to the exposed surface and are connected to each other at one side.

* * * * *